(12) United States Patent
Jang et al.

(10) Patent No.: US 10,803,323 B2
(45) Date of Patent: Oct. 13, 2020

(54) ELECTRONIC DEVICE AND METHOD OF DETECTING DRIVING EVENT OF VEHICLE

(71) Applicant: SAMSUNG ELECTRONICS CO., LTD., Suwon-si, Gyeonggi-do (KR)

(72) Inventors: Seo-woo Jang, Seongnam-si (KR); Dae-hyun Ban, Seoul (KR); Un-kyu Park, Seoul (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 50 days.

(21) Appl. No.: 15/979,915

(22) Filed: May 15, 2018

(65) Prior Publication Data

US 2018/0336424 A1    Nov. 22, 2018

Related U.S. Application Data

(60) Provisional application No. 62/506,712, filed on May 16, 2017.

(30) Foreign Application Priority Data

Apr. 27, 2018    (KR) .................. 10-2018-0049405

(51) Int. Cl.
*G06K 9/00* (2006.01)
*B60R 1/00* (2006.01)
(Continued)

(52) U.S. Cl.
CPC ............ *G06K 9/00791* (2013.01); *B60R 1/00* (2013.01); *B60W 30/00* (2013.01); *G05D 1/0238* (2013.01);
(Continued)

(58) Field of Classification Search
CPC .. G06K 9/00791; G06K 9/00805; G06N 3/08; G06N 3/084; G06N 3/0454;
(Continued)

(56) References Cited

U.S. PATENT DOCUMENTS 9,043,069 B1 * 5/2015 Ferguson .............. B60W 30/00 701/23
9,344,683 B1 * 5/2016 Nemat-Nasser ........ B60R 11/04
(Continued)

FOREIGN PATENT DOCUMENTS

CN    103996178    8/2014
CN    104570765    4/2015
(Continued)

OTHER PUBLICATIONS

Search Report and Written Opinion dated Sep. 6, 2018 in counterpart International Patent Application No. PCT/KR2018/005524.
(Continued)

*Primary Examiner* — Xuemei G Chen
(74) *Attorney, Agent, or Firm* — Nixon & Vanderhye P.C.

(57) ABSTRACT

Provided are an artificial intelligence (AI) system configured to simulate functions of a human brain, such as recognition, determination, or the like, using a machine learning algorithm, such as deep learning, and an application of the AI system. An electronic device includes: a processor; and a memory storing instructions executable by the processor, wherein the processor is configured to execute the instructions to cause the electronic device to: obtain, from a vehicle, a video sequence including a plurality of frames captured while driving the vehicle, recognize a location of an object included in at least one of the plurality of frames, analyze a sequential change with respect to the location of the object in the plurality of frames, and determine whether a driving event of the vehicle occurs.

19 Claims, 18 Drawing Sheets

(51) Int. Cl.
*G05D 1/02* (2020.01)
*G06T 7/20* (2017.01)
*G06K 9/62* (2006.01)
*G06K 9/46* (2006.01)
*B60W 30/00* (2006.01)

(52) U.S. Cl.
CPC ....... *G05D 1/0246* (2013.01); *G06K 9/00711* (2013.01); *G06K 9/00718* (2013.01); *G06K 9/00805* (2013.01); *G06K 9/4628* (2013.01); *G06K 9/6267* (2013.01); *G06T 7/20* (2013.01); *B60R 2300/205* (2013.01); *B60R 2300/30* (2013.01); *B60R 2300/8093* (2013.01); *G05D 2201/0213* (2013.01); *G06K 2009/00738* (2013.01); *G06T 2207/10016* (2013.01); *G06T 2207/20081* (2013.01); *G06T 2207/20084* (2013.01); *G06T 2207/30261* (2013.01)

(58) Field of Classification Search
CPC ................ G06N 3/0445; B60W 50/14; B60W 2050/146; B60W 2050/143; G05D 1/00
See application file for complete search history.

(56) References Cited

U.S. PATENT DOCUMENTS

| | | | |
|---|---|---|---|
| 9,346,167 B2* | 5/2016 | O'Connor | G06N 3/008 |
| 9,604,639 B2* | 3/2017 | Laur | B60W 30/0953 |
| 9,711,050 B2* | 7/2017 | Ansari | G08G 1/167 |
| 9,802,599 B2* | 10/2017 | Abou-Nasr | B60W 10/18 |
| 9,881,234 B2* | 1/2018 | Huang | G06K 9/6232 |
| 9,989,964 B2* | 6/2018 | Berntorp | G05D 1/0088 |
| 10,133,938 B2 | 11/2018 | Kim et al. | |
| 10,152,639 B2* | 12/2018 | Pathangay | G06K 9/00812 |
| 10,198,655 B2* | 2/2019 | Hotson | G06K 9/4604 |
| 10,255,510 B2* | 4/2019 | Yu | G06K 9/00805 |
| 10,558,891 B2* | 2/2020 | Wang | G06K 9/6202 |
| 10,579,058 B2* | 3/2020 | Oh | G06N 7/005 |
| 2007/0073463 A1 | 3/2007 | Sherony et al. | |
| 2012/0281093 A1* | 11/2012 | Fong | B60Q 9/005 348/148 |
| 2013/0250113 A1 | 9/2013 | Bechtel et al. | |
| 2014/0169627 A1 | 6/2014 | Gupta | |
| 2014/0254872 A1* | 9/2014 | Guan | G06K 9/00624 382/103 |
| 2016/0065903 A1* | 3/2016 | Wang | B60R 11/04 348/148 |
| 2016/0099010 A1* | 4/2016 | Sainath | G10L 25/30 704/232 |
| 2016/0101779 A1 | 4/2016 | Katoh | |
| 2016/0210383 A1 | 7/2016 | Alaniz et al. | |
| 2016/0358477 A1 | 12/2016 | Ansari | |
| 2017/0072850 A1* | 3/2017 | Curtis | G08G 1/166 |
| 2017/0076019 A1* | 3/2017 | Nallapa | G09B 9/04 |
| 2017/0109458 A1* | 4/2017 | Micks | G06F 3/0484 |
| 2017/0109625 A1 | 4/2017 | Dai et al. | |
| 2017/0132769 A1 | 5/2017 | Barron et al. | |
| 2017/0193310 A1* | 7/2017 | Yu | G06K 9/00201 |
| 2017/0193315 A1* | 7/2017 | El-Khamy | G06K 9/00288 |
| 2017/0255832 A1* | 9/2017 | Jones | G06N 3/0454 |
| 2017/0289405 A1* | 10/2017 | Agrawal | G06T 5/007 |
| 2018/0018524 A1* | 1/2018 | Yao | G06K 9/00362 |
| 2018/0075309 A1* | 3/2018 | Sathyanarayana | G05D 1/0088 |
| 2018/0121795 A1* | 5/2018 | Kato | G06F 17/7867 |
| 2018/0126902 A1* | 5/2018 | Seo | B60Q 1/525 |
| 2018/0143646 A1* | 5/2018 | Suk | G06K 9/00993 |
| 2018/0157386 A1* | 6/2018 | Su | G06F 9/451 |
| 2018/0158189 A1* | 6/2018 | Yedla | G06T 7/11 |
| 2018/0165527 A1* | 6/2018 | Park | G06K 9/00805 |
| 2018/0173240 A1* | 6/2018 | Fang | B60W 30/0956 |
| 2018/0181860 A1* | 6/2018 | Verbist | B60W 40/09 |
| 2018/0211120 A1* | 7/2018 | Smith | G06N 20/00 |
| 2018/0225808 A1* | 8/2018 | Chakraborty | B60K 35/00 |
| 2018/0241984 A1* | 8/2018 | Sun | G06N 3/08 |
| 2018/0253622 A1* | 9/2018 | Chen | G06N 3/0454 |
| 2018/0284785 A1* | 10/2018 | Berntorp | G05D 1/0214 |
| 2018/0341872 A1* | 11/2018 | Wang | G06N 3/0454 |
| 2019/0019087 A1* | 1/2019 | Fukui | G06N 20/00 |
| 2019/0164290 A1* | 5/2019 | Wang | G06T 7/10 |
| 2019/0202451 A1* | 7/2019 | Hayamizu | B60R 11/02 |
| 2019/0220029 A1* | 7/2019 | Fukuhara | G05D 1/0088 |
| 2019/0220691 A1* | 7/2019 | Valpola | G06K 9/6256 |
| 2019/0279045 A1* | 9/2019 | Li | G06K 9/6228 |

FOREIGN PATENT DOCUMENTS

| | | |
|---|---|---|
| KR | 10-2016-0071875 | 6/2016 |
| KR | 10-2017-0034226 | 3/2017 |
| WO | WO 2012/145819 A1 | 11/2012 |

OTHER PUBLICATIONS

Wu, Bichen et al., "SqueezeDet: Unified, Small, Low Power Fully Convolutional Neural Networks for Real-Time Object Detection for Autonomous Driving," arXiv:1612.01051v1 [cs.CV], Dec. 4, 2016, pp. 1-12.
Jo, Yong-Ho et al., "Classifications of Driving Patterns Using a Supervised Learning Method for Human-Vehicle Interaction," The 1st International Conference on Human-Agent Interaction, Oral Session II-1-4, Aug. 2013, pp. 1-6.
Ros, G., et al., "The Synthia Datase: A Large Collection of Synthetic Images for Semantic Segmentation of Urban Scenes", IEEE CVPR 2016, pp. 3231-3243.
He, K., et al., "Deep Residual Learning for Image Recognition", arXiv, Dec. 10, 2015, pp. 1-12.
Long, J., et al., "Fully Convolutional Networks for Semantic Segmentation", IEEE CVPR, 2015, 10 pages.
Shah, S., et al., "Aerial Information and Robotics Platform", Microsoft Research, Feb. 15, 2017, 17 pages.
U.S. Appl. No. 15/964,779, filed Apr. 27, 2018; Ban et al.
Krizhevsky et al., "ImageNet Classification with Deep Convolutional Neural Networks", 2012, 9 pages.
Ren et al., "Faster R-CNN:Towards real-time object detection with region proposal networks", Jan. 6, 2016, 14 pages.
Long et al., "Fully Convolutional Networks for Semantic Segmentation", 2015, 10 pages.
Badrinarayanan et al.,"Segnet: A Deep Convolutional Encoder-Decoder Architecture for Image Segmentation", IEEE, Oct. 10, 2016, 14 pages.
Noh et al., "Learning Deconvolution Network for Semantic Segmentation", 2015, pp. 1520-1528.
Chen et al., "Semantic image segmentation with deep convolutional nets and fully connected CRFs", http://arxiv.org/abs/1412.7062 , http://arxiv.org/abs/1502.02734, 2015, 37 pages.
Yu et al., "Multi-scale context aggregation by dilated convolution", Apr. 30, 2016, 13 pages.
Donahue et al., "Long-term Recurrent Convolutional Networks for Visual Recognition and Description", 2015, pp. 2625-2634.
Search Report and Written Opinion dated Sep. 28, 2018 in counterpart International Patent Application No. PCT/KR2018/006982.
Korean Notice of Allowance for KR Application No. 10-2018-0049405 dated Oct. 16, 2019.
European Extended Search Report dated Apr. 17, 2020 for EP Application No. 18801907.9.
Jesse Levinson et al: ""Traffic light mapping, localization, and state detection for autonomous vehicles"", Robotics and Automation (ICRA), 2011 IEEE International Conference on, May 1, 2011 (May 1, 2011), pp. 5784-5791, XP055478036.

* cited by examiner

FIG. 10

| TYPES OF EVENTS | LEVEL OF RISK OF DRIVING | CONTENT OF NOTIFICATION MESSAGE | CONTENT OF COMMAND FOR CONTROLLING VEHICLE |
|---|---|---|---|
| ACCIDENT PREDICTED DUE TO FAILURE TO ASSURE SAFE DISTANCE WITH RESPECT TO VEHICLE IN FRONT | HIGH | BEEP BEEP, PLEASE IMMEDIATELY STEP ON BRAKE | OPERATE BRAKE AT SPEED EQUAL TO OR GREATER THAN CERTAIN SPEED |
| WINDING ROAD AHEAD | MIDDLE | CAUTION, WINDING ROAD AHEAD | CONTROL STEERING WHEEL BY CERTAIN ANGLE |
| VEHICLE ENGAGED IN ACCIDENT AHEAD | LOW | VEHICLE ENGAGED IN ACCIDENT AHEAD, PLEASE CHANGE LANE TO RIGHT SIDE | ROTATE STEERING WHEEL TO AVOID VEHICLE ENGAGED IN ACCIDENT |
| CHANGE IN TRAFFIC SIGNAL FROM GREEN TO RED | HIGH | CHANGE IN TRAFFIC SIGNAL, PLEASE STOP | GRADUALLY OPERATE BRAKE TO STOP VEHICLE AT STOP LINE |
| CHANGE IN TRAFFIC SIGNAL FROM RED TO GREEN | LOW | CHANGE IN TRAFFIC SIGNAL, PLEASE START | GRADUALLY OPERATE ACCELERATOR TO START VEHICLE |

ELECTRONIC DEVICE AND METHOD OF DETECTING DRIVING EVENT OF VEHICLE

CROSS-REFERENCE TO RELATED APPLICATIONS

This application is based on and claims priority under 35 U.S.C. § 119 to U.S. Provisional Application No. 62/506,712, filed on May 16, 2017, in the United States Patent and Trademark Office, and to Korean Patent Application No. 10-2018-0049405, filed on Apr. 27, 2018, in the Korean Intellectual Property Office, the disclosures of which are incorporated by reference herein in their entireties.

BACKGROUND

1. Field

The disclosure relates to an artificial intelligence (AI) system configured to simulate functions of human intelligence, such as recognition, determination, or the like, using a machine learning algorithm, such as deep learning, and an application of the AI system, and for example, to a method and a device for determining an occurring event, based on a location of an object while driving of vehicle, using the AI system.

2. Description of Related Art

With developments in multimedia technologies and network technologies, users have been able to receive various services using an electronic device. As technologies applied to a vehicle have developed, various methods of recognizing whether or not a driving event of a vehicle occurs have been developed.

Meanwhile, a great amount of driving data is needed in order to recognize whether or not a driving event of a vehicle occurs, and thus, the demand for a technique configured to efficiently obtain driving data with little expense has increased.

An artificial intelligence (AI) system is a computer system capable of simulating human intelligence. The AI system performs self-learning and determination, thereby becoming smarter, unlike previous rule-based smart systems. The more the AI system is used, the higher a recognition rate of the AI system becomes, and a user's taste becomes more accurately understood. Thus, the previous rule-based smart systems have been gradually replaced by the deep learning-based AI system.

The AI technology includes machine learning (deep learning) and element technologies utilizing the machine learning.

The machine learning may be an algorithmic technology that self-classifies and learns features of input data. The element technology may be a technology configured to simulate functions of a human brain, such as recognition, determination, or the like, using the machine learning algorithm, such as deep learning, or the like, and includes linguistic understanding, visual understanding, inference/prediction, knowledge expression, operation control, or the like.

Various fields to which the AI technology is applied may include, for example, the following. Linguistic understanding may refer to a technique of recognizing and applying/processing human languages/characters and includes natural language processing, machine translation, conversation systems, question and answer providing, voice recognition/synthesis, or the like. Visual understanding may refer to a technique of recognizing and processing an object like in human vision and includes object recognition, object tracking, image searching, human recognition, scene understanding, spatial understanding, image improvement, or the like. Inference/prediction may refer to a technique of determining and logically inferring and predicting information and includes inference based on knowledge/probability, optimized prediction, preference-based planning, recommendation, or the like. Knowledge expression may refer to a technique of performing automation to convert experiential information of a human being into knowledge data and includes knowledge establishment (data generation/classification), knowledge management (data utilization), or the like. Operation control may refer to a technique of controlling autonomous driving of a vehicle and motion of a robot and includes motion control (a steering method, collision, driving), manipulation control (behavior control), or the like.

SUMMARY

Provided are a method and an electronic device for determining whether a driving event of a vehicle occurs, based on a location of an object in a plurality of frames, using a plurality of trained models.

Additional aspects will be set forth in part in the description which follows and, in part, will be apparent from the description.

In accordance with an aspect of the disclosure, an electronic device includes: a processor; and a memory storing instructions executable by the processor, wherein the processor is configured to execute the instructions to cause the electronic device to: obtain, from a vehicle, a video sequence including a plurality of frames captured while driving the vehicle, recognize a location of an object included in the plurality of frames, analyze a sequential change with respect to the location of the object in the plurality of frames, and determine whether a driving event of the vehicle occurs.

In accordance with another aspect of the disclosure, a method includes: obtaining, from a vehicle, a video sequence including a plurality of frames captured while driving the vehicle, recognizing a location of an object included in the plurality of frames, analyzing a sequential change with respect to the location of the object in the plurality of frames and determining whether a driving event of the vehicle occurs.

In accordance with another aspect of the disclosure, a computer program product includes a non-transitory computer-readable recording medium, the non-transitory computer-readable recording medium including instructions that when executed by a processor, cause an electronic device to: obtain, from a vehicle, a video sequence including a plurality of frames captured while driving the vehicle from the vehicle; recognize a location of an object included in the plurality of frames; analyze a sequential change with respect to the location of the object in the plurality of frames; and determine whether a driving event of the vehicle occurs.

BRIEF DESCRIPTION OF THE DRAWINGS

The above and other aspects, features, and advantages of certain embodiments of the present disclosure will be more apparent from the following description, taken in conjunction with the accompanying drawings, in which:

FIG. 10 is a chart illustrating an example of determining a notification message and a command for controlling a vehicle, based on a type of an event, according to an embodiment;

DETAILED DESCRIPTION

Figure 1:
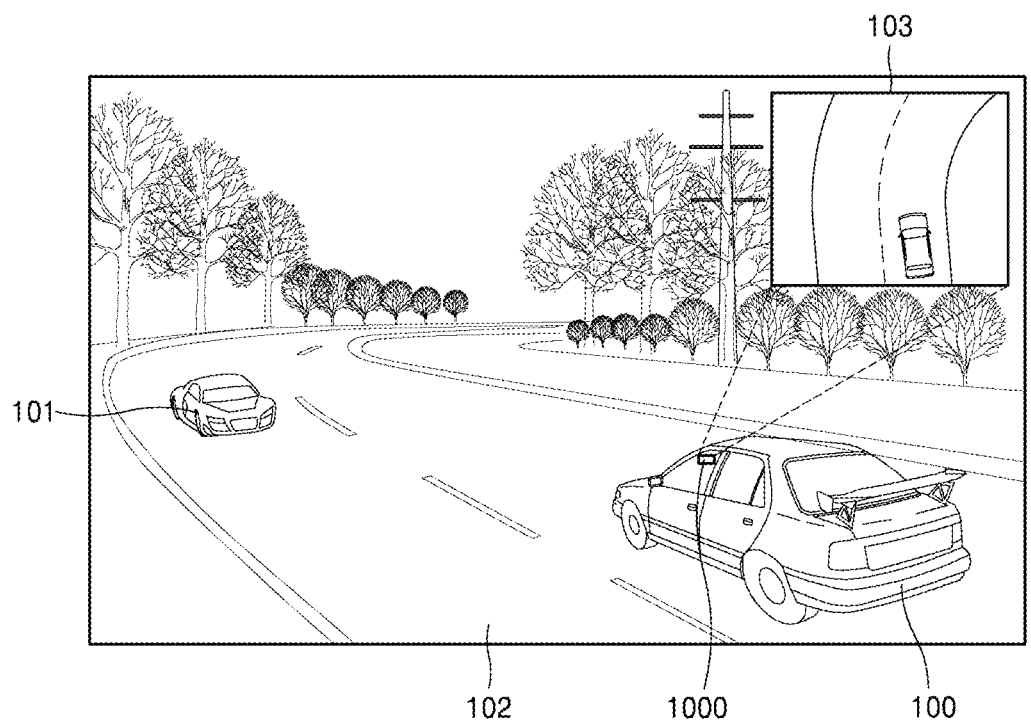
FIG. 1 is a diagram illustrating an example in which an electronic device detects an object in front of a vehicle and determines whether an event occurs, according to an embodiment.

Hereinafter, various example embodiments of the present disclosure will be described in greater detail with reference to the accompanying drawings to convey the concept of the disclosure to one of ordinary skill in the art. The present disclosure may, however, be embodied in many different forms and should not be understood as being limited to the embodiments set forth herein. Also, in order to clearly describe the present disclosure, functions or configurations that may obscure the points of the present disclosure may be omitted in the drawings, and like reference numerals refer to like elements throughout the disclosure. As used herein, the term "and/or" includes any and all combinations of one or more of the associated listed items. Expressions such as "at least one of," when preceding a list of elements, modify the entire list of elements and do not modify the individual elements of the list.

Throughout the disclosure, it will be understood that when an element is referred to as being "connected" to another element, it may be "directly connected" to the other element or "electrically connected" to the other element with intervening elements therebetween. It will be further understood that when a part "includes" or "comprises" an element, unless otherwise defined, the part may further include other elements, not excluding the other elements.

Hereinafter, embodiments will be described in greater detail with reference to the accompanying drawings.

FIG. 1 is a diagram illustrating an example in which an electronic device 1000 detects an object in front of a vehicle and determines whether an event occurs, according to an embodiment.

Referring to FIG. 1, the electronic device 1000 may be a device mounted in a vehicle 100. The electronic device 1000 may include various circuitry and components configured to receive a video sequence from a camera mounted in the vehicle 100 and determine occurrence of various events. Further, the electronic device 1000 may provide a notification message based on occurrence of events to a user.

According to an embodiment, the electronic device 1000 may be a device mounted in a driving device using a virtual environment, for example, a simulation driving device, a driving game machine, or the like, but is not limited thereto. The electronic device 1000 may receive virtual environment data having good graphics performance and determine occurrence of various events of the vehicle 100.

While it is described that the electronic device 1000 receives the video sequence from the camera mounted in the vehicle 100, it is not limited thereto. The electronic device 1000 may receive the video sequence from a camera configured to capture a surrounding environment of the vehicle 100. The surrounding environment of the vehicle 100 may include, for example, a front side, lateral sides, and a rear side.

According to an embodiment, the electronic device 1000 may detect an event using coordinate information, and thus, may differently recognize levels of importance of a type of object based on locations thereof, thereby determining whether an event occurs based on the locations of the object.

According to an embodiment, the electronic device 1000 may detect at least one video sequence 103 including an object, from among a plurality of video sequences. The electronic device 1000 may, for example, and without limitation, detect a road 102 including a fixed pattern and another vehicle 101 moving according to time, by analyzing the at least one video sequence 103. According to an embodiment, the electronic device 1000 may determine occurrence of an event based on the other vehicle 101, by analyzing a location of the other vehicle 101 by analyzing a coordinate of the other vehicle 101 in the at least one video sequence 103.

The electronic device 1000 may include various circuitry, including, for example, and without limitation, head units or embedded boards in vehicles, smartphones, tablet personal computers (PCs), PCs, smart televisions (TVs), cellular phones, personal digital assistants (PDAs), laptop computers, vehicles, media players, micro servers, global positioning system (GPS) devices, electronic book terminals, digital broadcasting terminals, navigation devices, kiosks, MP3 players, digital cameras, home appliances, and other mobile or non-mobile computing devices, or the like, but is not limited thereto. Also, the electronic device 1000 may include wearable devices having a communication function and a data processing function, such as, for example, watches, glasses, hair bands, rings, or the like. However, the electronic device 1000 is not limited thereto, and may include all types of devices configured to obtain an image (for example, a video and a still image) from a camera and provide a notification message to a user based on the obtained image.

According to an embodiment, the electronic device 1000 may be a module mounted in a vehicle including various circuitry and components. The electronic device 1000 may be configured to control an operation of the vehicle and communicate with other modules mounted in the vehicle via a certain network.

According to an embodiment, the electronic device 1000 may be a different device from a vehicle, such as a smartphone, or the like, but is not limited thereto. In this case, the electronic device 1000 may obtain a video sequence using a camera of the electronic device 1000, and may receive a video sequence from a camera configured to capture a surrounding environment of a vehicle via a certain network. The electronic device 1000 may communicate with a module included in a vehicle. For example, the electronic device 1000 may obtain the video sequence using the camera of the electronic device 1000 and may receive the video sequence from the camera configured to capture the surrounding environment of the vehicle. Also, when the electronic device 1000 is a different device from a vehicle, the electronic device 1000 may communicate with a module mounted in the vehicle to control an operation of the vehicle.

According to an embodiment, the vehicle may include any means of transportation, such as, for example, and without limitation, an automobile, a bus, a truck, a train, a bicycle, a motorcycle, or the like, providing a communication function, a data processing function, and/or a transportation function.

According to an embodiment, the vehicle may include, for example, and without limitation, a driving simulator system configured to detect an event of a vehicle using virtual reality and a real time vehicle analysis program. According to an embodiment, the simulator may be configured to test and evaluate a real or virtual moving system model via a computer program, after the real or virtual moving system model is manufactured, and thus, may be used to efficiently obtain driving data based on the movement of a vehicle in a virtual reality.

Also, the electronic device 1000 may communicate with a server 2000 (see, e.g., FIG. 18) and another electronic device (not shown) via a certain network, in order to receive a video sequence, transmit a notification message, and transmit a command for controlling an operation of the other electronic device. In this case, the network may include, for example, and without limitation, a local area network (LAN), a wide area network (WAN), a value-added network (VAN), a mobile radio communication network, a satellite communication network, or the like, and any combinations thereof. The network may be a comprehensive data communication network configured to enable components included in the network to smoothly communicate with one another, and may include the wired Internet, the wireless Internet, and a mobile wireless communication network. The wireless communication may include, for example, and without limitation, wireless LAN (Wi-fi), Bluetooth, Bluetooth low energy, Zigbee, Wi-fi direct (WFD), ultra wide-band (UWB), infrared data association (IrDA), near-field communication (NFC), or the like, but is not limited thereto.

Figure 2:
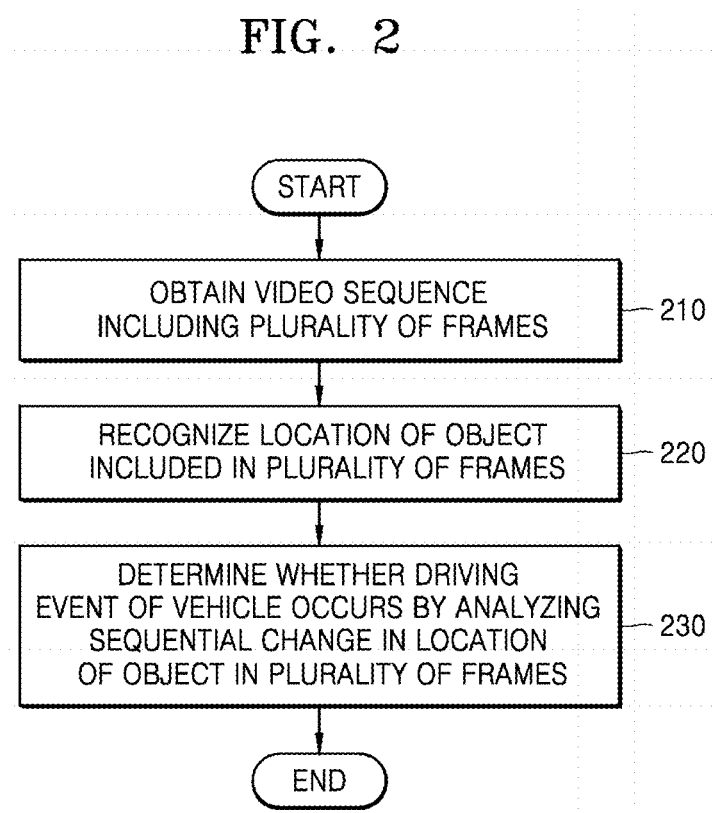
FIG. 2 is a flowchart illustrating a method of determining whether an event occurs, via an electronic device, according to an embodiment.

FIG. 2 is a flowchart illustrating a method of determining whether an event occurs via the electronic device 1000, according to an embodiment.

In operation 210, the electronic device 1000 may obtain a video sequence including a plurality of frames from, for example, a camera mounted in a vehicle. According to an embodiment, the electronic device 1000 may receive the video sequence by communicating with the camera mounted in the vehicle via a certain network. For example, the video sequence may be a black box image of the vehicle or an image received from a stereo camera of the vehicle. According to an embodiment, the electronic device 1000 may include a camera and may obtain the video sequence from the camera included in the electronic device 1000.

The video sequence may include a series of still images. Each of the still images may refer to a picture or a frame.

In operation 220, the electronic device 1000 may recognize a location of an object included in the plurality of frames. According to an embodiment, the electronic device 1000 may detect one or more objects from one frame included in the video sequence. The one or more objects detected from the frame may be detected from another frame included in the same video sequence. The one or more objects detected from the frame may not be detected from another frame included in the same video sequence. For example, a road, a sidewalk, a first vehicle, a second vehicle, a third vehicle, and a traffic sign may be detected from a first frame, while only the road, the sidewalk, the first vehicle, and the third vehicle may be detected and the second vehicle and the traffic sign may not be detected from a second frame included in the same video sequence as the first frame. Also, a motorcycle, which is not detected from the first frame, may be detected from the second frame.

According to an embodiment, the electronic device 1000 may obtain location information of the object using, for example, an artificial intelligence (AI) learning model. For example, the electronic device 1000 may recognize where the first vehicle is located in the first frame based on coordinate information of the first vehicle in the first frame. Also, the electronic device 1000 may recognize a distance between the first vehicle and the third vehicle using the location of the first vehicle and a location of the third vehicle in the first frame. Also, the electronic device 1000 may recognize an amount of change in a distance between the first vehicle and the third vehicle in a third frame using a location of the first vehicle and a location of the third vehicle in the third frame.

According to an embodiment, the electronic device 1000 may determine a type of the object. The electronic device 1000 may determine whether the object is noise, based on information about an available size of the type of the object in a location in which the object is recognized. According to an embodiment, the electronic device 1000 may determine whether the object is noise, by comparing information about a reference size of the type of the object in the recognized location of the object with information about a size of the object in the recognized location of the object.

According to an embodiment, the information about the available size of the type of the object may include size information which is set based on a predetermined shape based on the type of the object. According to an embodiment, the size information may include information in which a range of an area of a frame to be occupied by the object is predefined based on a distance between a vehicle and the object.

According to an embodiment, the size information may include information about a range of an area of a frame to be occupied by an object. According to an embodiment, as a distance between a vehicle and the object decreases, the area to be occupied by the object in the frame may increase, and as the distance between the vehicle and the object increases, the area to be occupied by the object in the frame may decrease. According to an embodiment, the size information may be predetermined based on types of the object. According to an embodiment, the size information may be learned by AI based on types of the object.

According to an embodiment, the electronic device 1000 may determine types of the object.

The types of the object may include, for example, and without limitation, a road, a sidewalk, a building, a wall, a fence, a pole, a traffic light, a traffic sign, vegetation, terrain, sky, a person, a rider, a car, a truck, a bus, a train, a motorcycle, a bicycle, or the like.

For example, the electronic device 1000 may detect a plurality of objects from one frame and may determine a type of each of the plurality of objects. Also, even if some of the plurality of objects are the same types, the electronic device 1000 may distinguish the same types of objects from one another. For example, when three vehicles are detected in one frame, the electronic device 1000 may distinguish the three vehicles as a first vehicle, a second vehicle, and a third vehicle.

According to an embodiment, the electronic device 1000 may use a first trained model in order to detect an object included in a frame and a location of the object. According to an embodiment, the first trained model may be obtained based on a result of learning a location of an object, the location corresponding to a coordinate of the object in a plurality of frames by detecting the object in a video sequence including the plurality of frames captured during driving of a vehicle and simultaneously mapping the coordinate information to the object.

Thus, when the frames obtained from the video sequence are input in the first trained model, location information of the object detected from the frames may be output from the first trained model.

According to an embodiment, with respect to one frame, the electronic device 1000 may determine where an object is located in the frame. For example, the electronic device 1000 may determine where an object is located in another frame. Also, for example, the electronic device 1000 may determine where a plurality of objects are located in one frame. For example, the electronic device 1000 may determine where a plurality of objects are located in another frame. That is, the electronic device 1000 may determine at which coordinates in each of the frames the plurality of objects are located. According to an embodiment, the coordinates may denote XY coordinates, and location values of the objects may be output as matrix values.

According to an embodiment, the electronic device 1000 may determine the locations of the objects via a pixel unit. For example, the electronic device 1000 may determine a pixel indicating an object from among pixels included in a frame. For example, when one frame includes a plurality of objects, the electronic device 1000 may determine the pixels indicating the plurality of objects, respectively. For example, the electronic device 1000 may determine which one of detected objects a certain pixel included in a frame indicates.

The method performed by the electronic device 1000 to accurately obtain the location information of the objects in the pixel unit, without using a bounding box, may be applied to a technical field requiring a precise recognition function.

For example, since the electronic device 1000 may obtain the location information of the objects via the pixel unit, the electronic device 1000 may analyze a sequential change in the locations of the objects and use the analyzed result for an autonomous driving technique requiring fast and accurate recognition.

According to an embodiment, the electronic device 1000 may use the first trained model to obtain the information about locations of the objects. When a plurality of frames are input in the first trained model, pixel information may be output. The pixel information may be information about which object each of the pixels included in the plurality of frames indicates.

It is described above that operations 210 and 220 are separate operations. However, the present disclosure is not limited thereto. For example, when a plurality of frames and coordinate information corresponding to the plurality of frames are input in the first trained model, information about objects detected from the plurality of frames and coordinate information of the objects may be output together. As another example, only the pixel information with respect to the object may be output.

According to an embodiment, in operation 230, the electronic device 1000 may determine whether a driving event of a vehicle occurs, by analyzing a sequential change in the locations of the objects in the plurality of frames.

According to an embodiment, the electronic device 1000 may analyze the change in the location of the object between a previous frame and a next frame, based on a display order of the video sequence. For example, the electronic device 1000 may analyze the change in the location of the object, by comparing location information of the object included in the first frame, which is displayed first, and location information of the same object included in the second frame, which is displayed next. For example, the electronic device 1000 may determine whether an event occurs, by analyzing the change in the location of each of the plurality of objects according to time. That is, the electronic device 1000 may recognize in a complex manner the changes in the locations of the plurality of objects via changes in coordinates of the objects, rather than tracking a bounding box with respect to region of interest (ROI). Thus, the electronic device 1000 may more accurately determine whether an event occurs. For example, when a first vehicle and a second vehicle are stopped ahead and a third vehicle, a fourth vehicle, and a fifth vehicle consecutively change a lane to a right side, the electronic device 1000 may determine occurrence of an event in which there are vehicles ahead engaged in an accident. Also, the electronic device 1000 may determine an action guide that it had better change the lane to the right side since there are the vehicles ahead engaged in an accident, the action guide corresponding to the event.

According to an embodiment, the electronic device 1000 may determine a type of the event by analyzing the sequential change in the locations of the objects in the plurality of frames.

Types of a driving event of a vehicle may include, but are not limited to, a change in a traffic signal, prediction of an accident, a change in a road situation, a change in terrain, or the like. Examples of the change in the traffic sign may include a traffic light changing from green to red, or from red to green. Examples of the prediction of the accident may include a failure to assure a safe distance with respect to a vehicle ahead and/or a vehicle at the back, appearance of an unpredicted figure, etc. Examples of the change in the road situation may include a traffic jam due to accident vehicles in front. Examples of the change in the terrain may include winding roads ahead, hills in front, etc.

According to an embodiment, the electronic device 1000 may determine a level of risk of driving by analyzing the sequential change in the locations of the objects in the plurality of frames.

For example, the level of risk of driving may be indicated via a numeral value, wherein as the numeral value increases, the level of risk may increase. For example, the level of risk may be indicated as an integer between a value which is equal to or greater than 1 and a value which is equal to or less than 100. When the level of risk is equal to or greater than a critical value, it may be set in the electronic device 1000 to include the level of risk of driving in a notification message. Also, for example, the level of risk of driving may be indicated as high, middle, and low.

According to an embodiment, the electronic device 1000 may use a second trained model to determine whether an event occurs. When an output value related to an object that is output from the first trained model is input in the second trained model, whether an event occurs may be output.

According to an embodiment, the operation of detecting the object, the operation of obtaining the information about the locations of the object, and the operation of determining whether an event occurs may be performed using a plurality of trained models.

Figure 3:
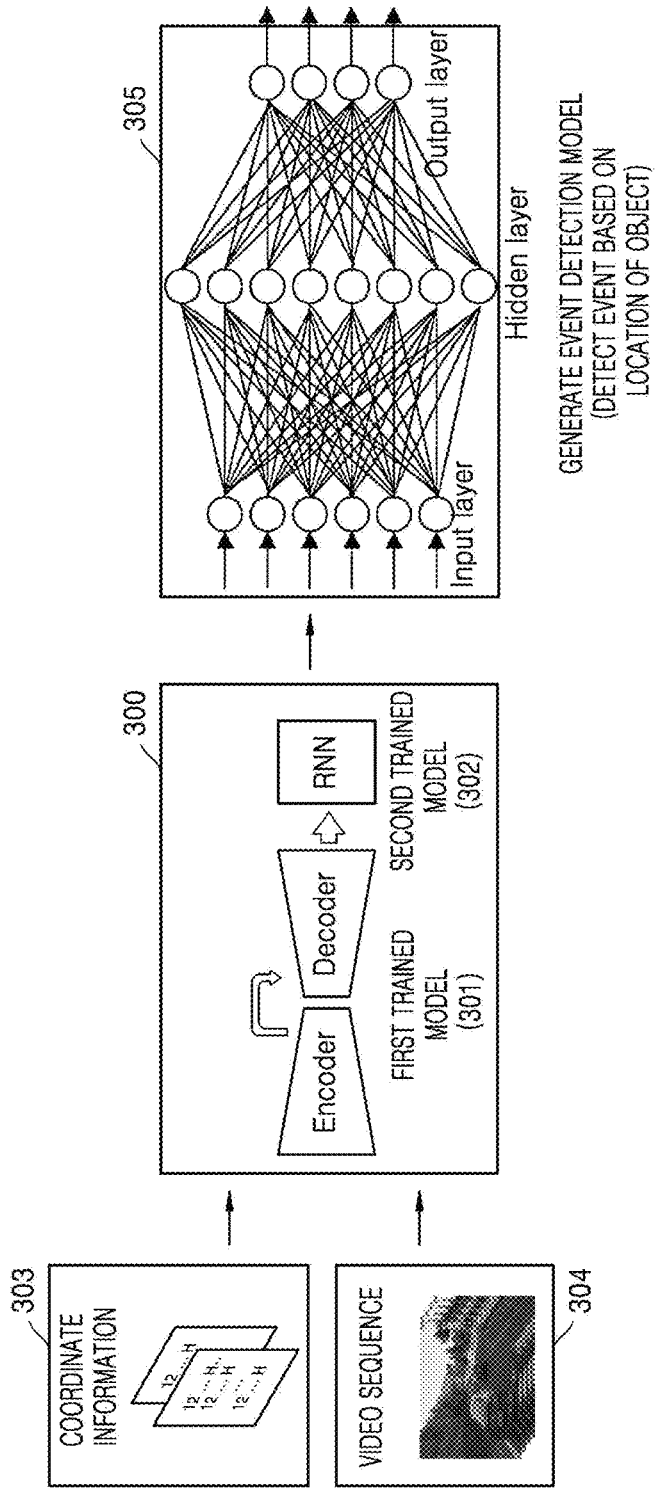
FIG. 3 is a diagram illustrating an operation of generating a trained model configured to determine whether a driving event of a vehicle occurs, according to an embodiment.

FIG. 3 is a diagram illustrating an operation of generating a trained model configured to determine whether a driving event of a vehicle occurs, according to an embodiment.

According to an embodiment, an event detection model (e.g., including processing circuitry and/or program elements) 305 configured to detect a driving event of a vehicle based on a location of an object may be generated by training a first trained model (e.g., including processing circuitry and/or program elements) 301 and a second trained model (e.g., including processing circuitry and/or program elements) 302 using coordinate information 303 and a video sequence 304 including the coordinate information 303, according to an embodiment.

According to an embodiment, the first trained model 301 may include various processing circuitry and/or program elements and be generated by learning a reference for determining a type of an object and a reference for determining a location of the object in each of a plurality of frames, using, for example, and without limitation, a fully convolutional network (FCN), or the like.

According to an embodiment, the electronic device 1000 may input the video sequence 304 including frames including RGB channels in the first trained model 301 together with the coordinate information 303. According to an embodiment, the first trained model 301 may include various processing circuitry and/or program elements and be trained to recognize the locations of the object in the plurality of frames in the video sequence 304 using the coordinate information 303 explicitly input in a previous model configured to learn using an encoder and a decoder.

According to an embodiment, the electronic device 1000 may convert the frames including the RGB channels into luminance-chromatic (Lab) channels. An L value of the converted Lab channel is a luminance value of an image indicating a brightness of the image except for color information. The electronic device 1000 may perform preprocessing whereby a median filter for flattening the L values of the plurality of frames is applied to the plurality of frames included in the video sequence 304, before inputting the plurality of frames to the first trained model. Via the preprocessing, the object may be easily detected and a plurality of objects may be distinguished from one another, whether it is dark or rainy.

According to an embodiment, the electronic device 1000 may determine a type of the object included in the plurality of frames using the first trained model 301. For example, the electronic device 1000 may detect a plurality of objects from one frame and determine types of the plurality of objects, using the first trained model 301. For example, when one frame is input in the first trained model 301, different values may be output based on the types of the objects included in the frame. For example, it may be set in the first trained model 301 that the sky is 12, a plant is 10, a road is 4, a sidewalk is 3, a vehicle is 6, a person is 8, etc. For example, when a plant, a road, a vehicle, and a person are included in a frame input in the first trained model 301, the output of the first trained model 301 may include 4, 6, 8, and 10. Thus, which objects are included in the frame may be detected using the first trained model 301. Also, for example, when a frame is input in the first trained model 301, pixel information about which object each of pixels included in the frame indicates may be output, rather than values corresponding to the types of the objects. The pixel information may be a matrix in which the values corresponding to the types the objects are matched with locations of the objects in the frame.

According to an embodiment, the electronic device 1000 may reduce a dimension of the output of the first trained model 301 in order to input the output to the second trained model 302.

According to an embodiment, the second trained model 302 may be generated by learning a reference for determining whether a driving event of a vehicle occurs by analyzing a sequential change in the location of the object in the plurality of frames, using, for example, and without limitation, a recurrent neural network (RNN), or the like.

According to an embodiment, the output of the first trained model 301 may be used as an input of the second trained model 302. According to another embodiment, the electronic device 1000 may use a matrix generated by reducing a dimension of the matrix output from the first trained model, as the input of the second trained model, in order to reduce the amount of operations of the second trained model 302 configured to determine whether an event occurs. For example, dilated convolution, or the like, may be used to reduce the dimension of the matrix.

Also, according to an embodiment, in order to reduce the amount of operations of the first trained model 301, the electronic device 1000 may perform 1×1 convolution filtering on outputs of layers included in the first trained model 301 to match the dimensions among the layers included in the first trained model 301.

According to an embodiment, when a first vehicle and a second vehicle is stopped in front and third through fifth vehicles consecutively change a lane to a right side, the electronic device 1000 may determine occurrence of an event in which there are vehicles engaged in an accident in front. Also, the electronic device 1000 may determine an action guide that it had better change the lane to the right side since there are the vehicles ahead engaged in the accident, the action guide corresponding to the event.

As described above, the electronic device 1000 may obtain the information about the types of the objects and the information about the locations of the objects of the entire screen using a small amount of operations via the first trained model 301 in which the coordinate information 303 is input. Thus, the electronic device 1000 may rapidly and accurately analyze the sequential change in the locations of the objects without setting the ROI, as in a method of tracking an object.

Thus, the electronic device 1000 may determine occurrence of an event which may be detected by analyzing the sequential change in the location of the object, in addition to the driving event of the vehicle, using the second trained model 302 input to the event detection model 305.

Figure 4:
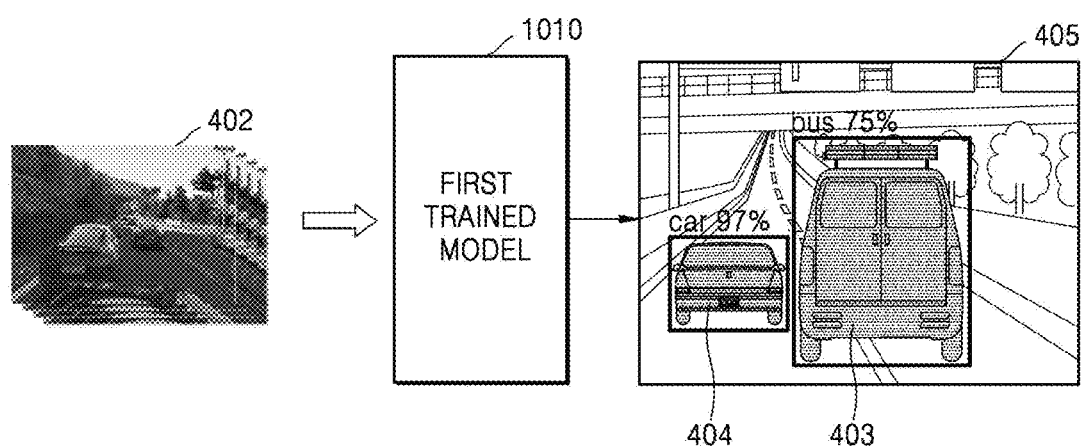
FIG. 4 is a diagram illustrating an example of detecting an object using a first trained model, according to an embodiment.

FIG. 4 is a diagram illustrating an example of detecting an object using a first trained model 1010, according to an embodiment.

According to an embodiment, the electronic device 1000 may detect an object in a frame and recognize a location of the object, using the first trained model (e.g., including processing circuitry and/or program elements) 1010 learned using, as an input value, a video sequence 402 including a plurality of frames obtained during driving of a vehicle.

According to an embodiment, coordinate information may denote two-dimensional coordinates of (x, y). For example, the location of the object may be recognized using the coordinate information of the object in a frame that is output from the first trained model 1010. For example, when a plant, a road, a vehicle, and a person are included in the frame that is input in the first trained model 1010, an output of the first trained model 1010 may include 4 (1, 4), 6 (3, 4), 8 (10, 23), and 10 (15, 11). Thus, it may be detected where a certain object is located in the frame using the first trained model 1010. According to an embodiment, information about the plurality of objects learned using the first trained model 1010 may be output as a matrix value.

According to an embodiment, for example, the electronic device 1000 may determine locations of the object in units of pixels using the first trained model 1010. For example, the electronic device 1000 may determine which objects pixels included in a frame indicate, and thus, when a frame including an object is input in the first trained model 1010, a matrix in which a value corresponding to a type of the object is matched to a location of the object in the frame may be output. The locations of the object are determined in the pixel unit, and thus, when, for example, a size of a frame is 512×256, a size of the matrix may also be 512×256. That is, as the output of the first trained model with respect to the input of the frame, the matrix including the information about the type of the object and the information about the location of the object may be obtained.

According to an embodiment, since the first trained model 1010 uses the FCN, when the electronic device 1000 inputs the video sequence 402 in the first trained model 1010, the type of the object and the location of the object may be output. According to an embodiment, the first trained model 1010 may detect the location of the object using a little amount of operations, by learning to detect the object and recognize the location of the object at the same time, based on the coordinate information explicitly input in the first trained model 1010.

According to an embodiment, when a series of matrices output from the first trained model 1010 are generated into an image, a video sequence 405 in which objects included in the video sequence 405 are indicated in different colors based on types thereof may be obtained. For example, a road forming a constant pattern and a vehicle that is a moving object may be indicated in different colors. According to an embodiment, the electronic device 1000 may detect a type of the object and a level of accuracy of object recognition. For example, the electronic device 1000 may determine types and locations of a first object 403 and a second object 404 in the video sequence 405 output from the first trained model 1010.

According to an embodiment, the electronic device 1000 may recognize with a level of accuracy of 75% that the first object 403 is a bus using information about a shape and a location of the first object 403, and recognize with a level of accuracy of 97% that the second object 404 is a car using information about a shape and a location of the second object 404.

Figure 5:
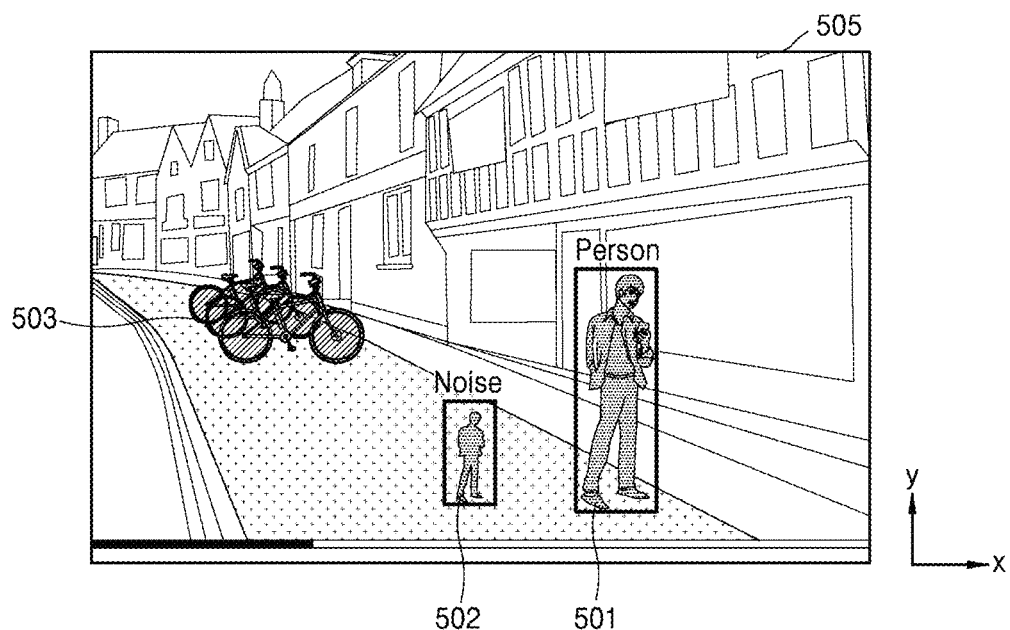
FIG. 5 is a diagram illustrating an operation of determining whether a detected object is noise or an object, based on a distance between the detected object and a vehicle, according to an embodiment.

FIG. 5 is a diagram illustrating an operation of determining whether an object that is detected is an object or noise, based on a distance between the detected object and a vehicle, according to an embodiment.

According to an embodiment, the electronic device 1000 may detect a first object 501, a second object 502, and a third object 503 and recognize locations thereof in a video sequence 505 output using, for example, the first trained model 1010. The electronic device 1000 may determine that a distance between a driving vehicle and the third object 503 is greater compared to a distance between the driving vehicle and the first object 501 and a distance between the driving vehicle and the second object 502. The electronic device 1000 may determine a low level of importance of occurrence of an event with respect to the third object 503 located relatively far from the driving vehicle.

According to an embodiment, the electronic device 1000 may determine types of the first object 501 and the second object 502. According to an embodiment, the electronic device 1000 may determine the types of the first object 501 and the second object 502 as human beings, and thus, may display the first object 501 and the second object 502 as the same color in the video sequence 505. According to an embodiment, the electronic device 1000 may detect noise based on location coordinates of the first object 501 and the second object 502. For example, the location of the second object 502 is similar to the location of the first object 501, and thus, the electronic device 1000 may determine that the distances between the first object 501 and the second object 502, and the driving vehicle are similar to each other. However, the electronic device 1000 may determine that a size of the second object 502 is significantly less than a size of the first object 501. According to an embodiment, the electronic device 1000 may determine that the second object 502 is noise information rather than a human being, based on information about a size of a human being recognized in the location of the second object 502. Thus, the electronic device 1000 may display the second object 502 in a different color from the first object 501.

Figure 6:
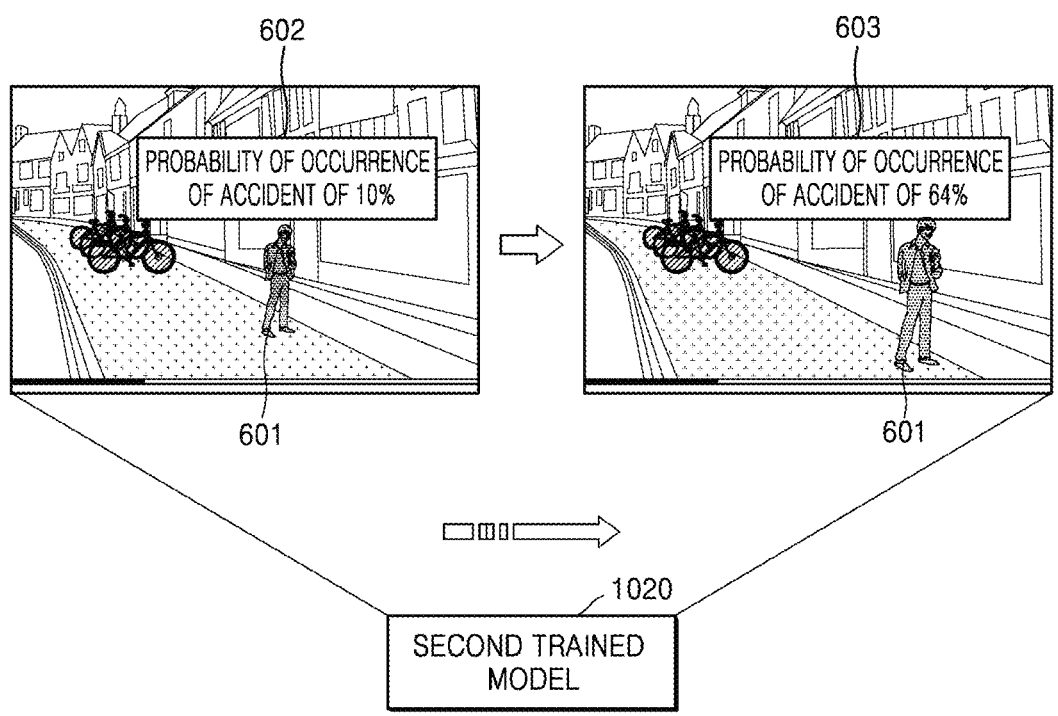
FIG. 6 is a diagram illustrating an example of determining whether an event occurs based on sequential movement of an object using a second trained model, according to an embodiment.

FIG. 6 is a diagram illustrating an example of determining whether an event occurs based on sequential movement of an object using a second trained model 1020, according to an embodiment.

According to an embodiment, when frames including the object including the location information, output from the first trained model 1010, are input in the second trained model 1020, it may be determined whether an event related to the object occurs.

According to an embodiment, the second trained model 1020 may use, for example, and without limitation, an RNN, which may refer, for example, to a neural network in which nodes are recurrently connected to one another in different temporal sections. The RNN according to an embodiment may recognize sequential data. The sequential data is data having a temporal characteristic or an order, such as voice data, image data, bio-data, handwriting data, or the like. For example, a recognition model of the RNN may recognize a pattern based on which image data that is input changes.

The RNN may be trained via supervised learning in which learning data and output data corresponding thereto are input in the neural network and connection weights of connecting lines are modified and refined so that the output data corresponding to the learning data is output. For example, the RNN may modify and refine the connection weights between neurons based on a delta rule and back propagation learning.

According to an embodiment, the second trained model 1020 may include various processing circuitry and/or program elements and use the RNN including a long short-term memory (LSTM) network. Thus, the second trained model 1020 may use a structure related to all of a previous step, a present step, and a next step for learning, and information of the present step may be transmitted to the next step to affect an output value. Thus, the electronic device 1000 may determine an event which may occur to a driving vehicle, based on a learning result for understanding a context of a driving image of the vehicle.

For example, the second trained model 1020 may recognize the object 601, which is located closer to the driving vehicle in the next frame than in the previous frame, and may determine that collision between an object 601 and the driving vehicle occurs.

According to an embodiment, the second trained model 1020 may predict a probability of occurrence of an event based on an object, by analyzing a sequential change in a location of the object. For example, the second trained model 1020 may determine a probability of occurrence of an accident based on a distance between the object 601 and a vehicle, the distance being determined based on the location of the object 601. According to an embodiment, when the second trained model 1020 determines that the distance between the object 601 and the vehicle is great, the second trained model 1020 may determine that the probability of the occurrence of the accident is 10% as described in operation 602. When the second trained model 1020 determines that the distance between the vehicle and the object 601 has decreased as the vehicle and the object 601 move according to time, the second trained model 1020 may determine that the probability of the occurrence of the accident is 64% as described in operation 603. According to an embodiment, the probability of the occurrence of the accident based on the movement of the vehicle and the object 601 according to time may be learned by the second trained model 1020.

For convenience of explanation, the descriptions are given by separating the first trained model 1010 and the second trained model 1020. However, the first trained model 1010 and the second trained model 1020 may include a plurality of trained models based on functions thereof, or one integrated trained model.

Figure 7:
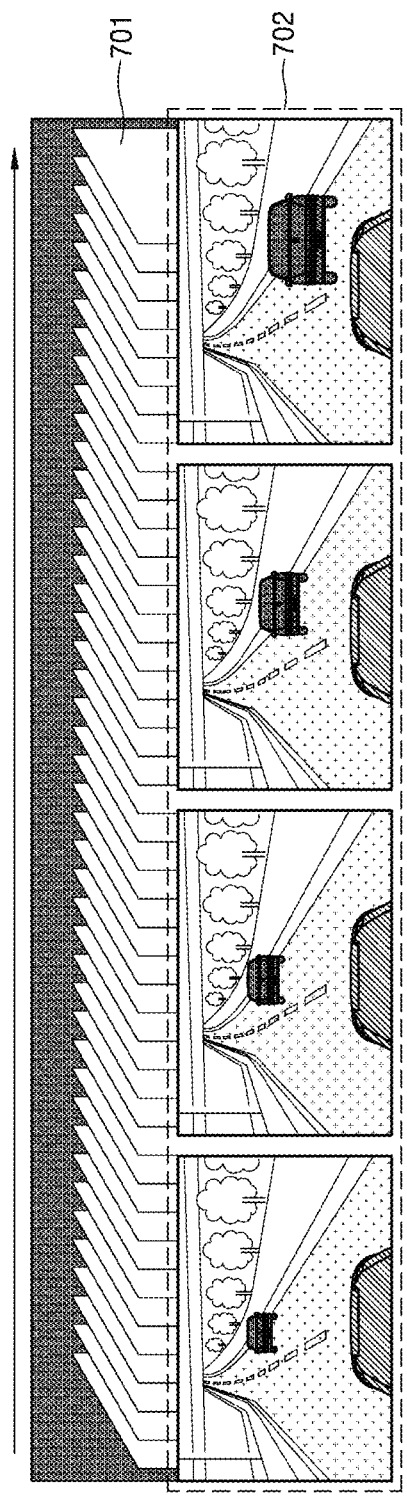
FIG. 7 is a diagram illustrating an example of obtaining a frame of an object detected in front of a vehicle from among a plurality of data frames, in order to detect occurrence of an event according to time, according to an embodiment.

FIG. 7 is a diagram illustrating an example of obtaining a frame of an object detected in front of a vehicle, in order to detect whether an event occurs according to time, from among a plurality of frames, according to an embodiment.

According to an embodiment, the electronic device 1000 may segment frames 702 including an object using a video sequence including a plurality of frames 701. According to an embodiment, the electronic device 1000 may input the plurality of frames 701 in a first trained model including a combination of an FCN and a convolutional neural network (CNN) and may output the segmented frames 702 including the object while recognizing a location of the object. Next, the electronic device 1000 may input the segmented frames 702 including the object in a second trained model including the LSTM network, in order to determine whether an event occurs in the frames 702 including the object.

According to an embodiment, the electronic device 1000 may recognize sequential motions of the object using the first trained model and the second trained model and may determine occurrence of various events based on the object.

Figure 8:
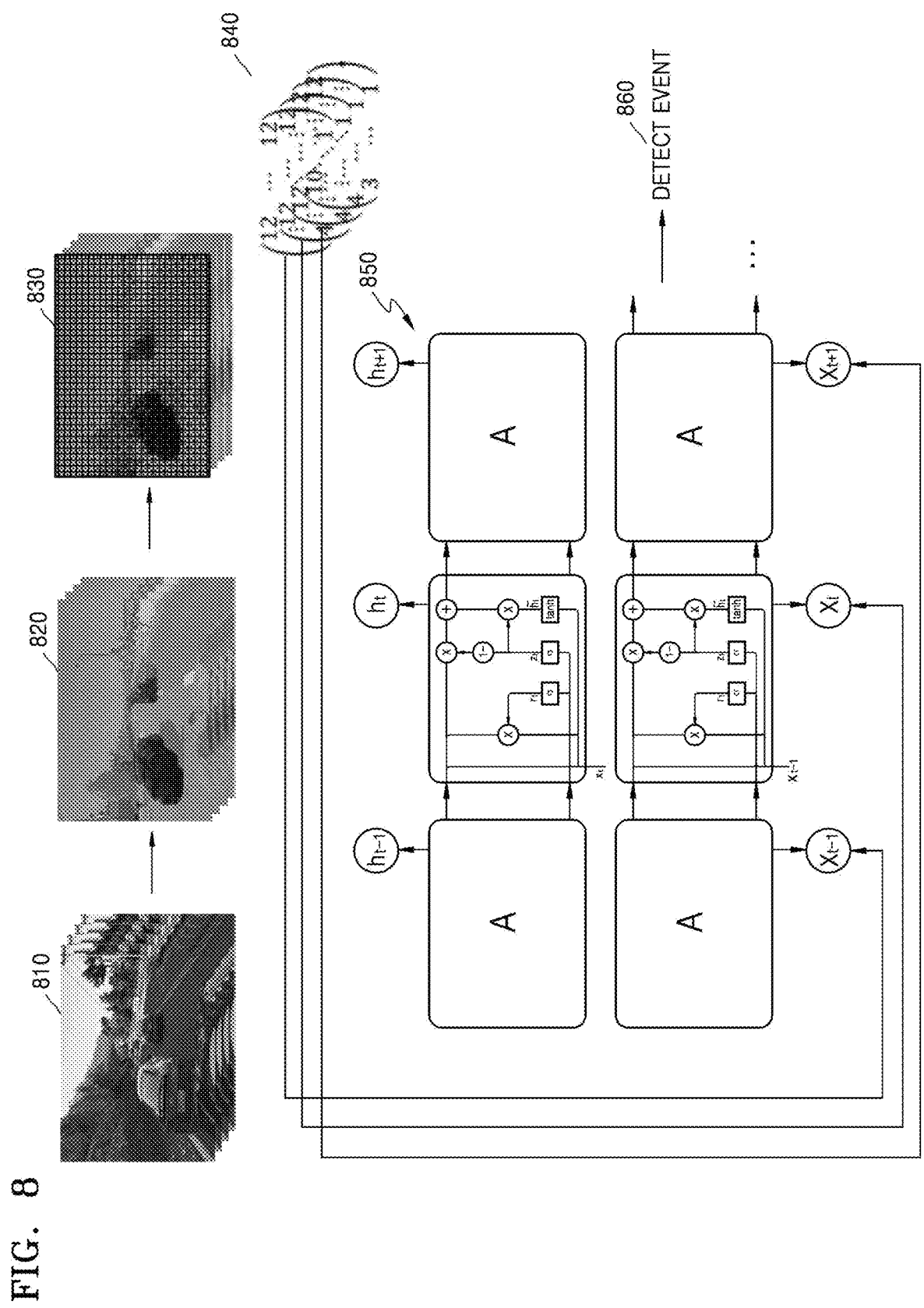
FIG. 8 is a diagram illustrating an example of detecting whether an event occurs, via sequential frame analysis, using a trained model, according to an embodiment.

FIG. 8 is a diagram illustrating an example of detecting whether an event occurs, via sequential frame analysis, using trained models, according to an embodiment.

A CNN includes a fully connected layer in a layer of a back part, in order to classify a class of image data. Here, when location information of an object in an input image passes through the fully connected layer, the location information is lost. To make improvements with respect to this problem, an FCN may regard the fully connected layer of the CNN as 1×1 convolution so that the location information may be maintained.

According to an embodiment, the first trained model uses the FCN, and thus, when a video sequence 810 is input in the first trained model, the electronic device 1000 may output a series of matrices including information about types and locations of objects. According to an embodiment, the video sequence 810 on which preprocessing is performed so as to be input in the first trained model may be input in the first trained model based on a display order. An output order of the matrices output from the first trained model may be the same as an input order of the video sequence 810 input in the first trained model.

When the series of matrices output from the first trained model are made into an image, a video sequence 820 in which objects included in the video sequence 810 are displayed in different colors based on types thereof may be obtained. Here, locations of the objects may be identified via coordinate information of the objects included in the video sequence 810 output from the first trained model. According to an embodiment, when dilated convolution is performed on a video sequence 830 generated by dividing the video sequence 820 in units of pixels, a matrix 840 in which a dimension of the matrices output from the first trained model is reduced may be obtained. The dilated convolution is a method of performing convolution using only some of pixels included in the video sequence 830. For example, the convolution is performed by skipping one or more pixel units, thereby dilating a size of a receptive field (RF) and reducing the dimension of the matrices and the amount of operations.

According to an embodiment, when the matrix 840 is input in the second trained model, an event 860 based on an object may be detected. The second trained model uses an RNN, which is a neural network in which nodes are recurrently connected to one another in different temporal sections. The RNN according to an embodiment may recognize sequential data. The sequential data is data having a temporal characteristic or an order, such as voice data, image data, bio-data, handwriting data, or the like. For example, a recognition model of the RNN may recognize a pattern based on which image data that is input changes.

The RNN may be trained via supervised learning in which learning data and output data corresponding thereto are input in the neural network and connection weights of connecting lines are modified and refined so that the output data corresponding to the learning data is output. For example, the RNN may modify and refine the connection weights between neurons based on a delta rule and back propagation learning.

The RNN may be a structure including an LSTM network 850. The LSTM network 850 may be a type of the RNN capable of performing long-term dependency learning. The RNN not including the LSTM network 850 may connect previous information to a present operation, but may have difficulty connecting information of past operations to the present operation. The LSTM network 850 may be a structure designed to avoid this long-term dependency problem. The LSTM network 850 may extract a relative change amount in input data, which varies according to time, as a characteristic value, and thus, may analyze a sequential change in the location of the object so as to determine whether an event occurs.

The second trained model may use the RNN including the LSTM network 850, and thus, may use structures related to all of a previous step, a present step, and a next step for learning, and information of the present step may be transmitted to the next step and may affect the output value.

According to an embodiment, the matrix 840 in which the dimension of the output of the first trained model is reduced may be input in the second trained model based on the order output from the first trained model. The second trained model may generate a notification message or a command to control a driving vehicle, by taking into account whether an event occurs, a type of the event, a level of risk of driving, etc.

For convenience of explanation, the descriptions are given by separating the first trained model and the second trained model. However, the first trained model and the second trained model may include a plurality of trained models based on function thereof, or one integrated trained model.

Figure 9:
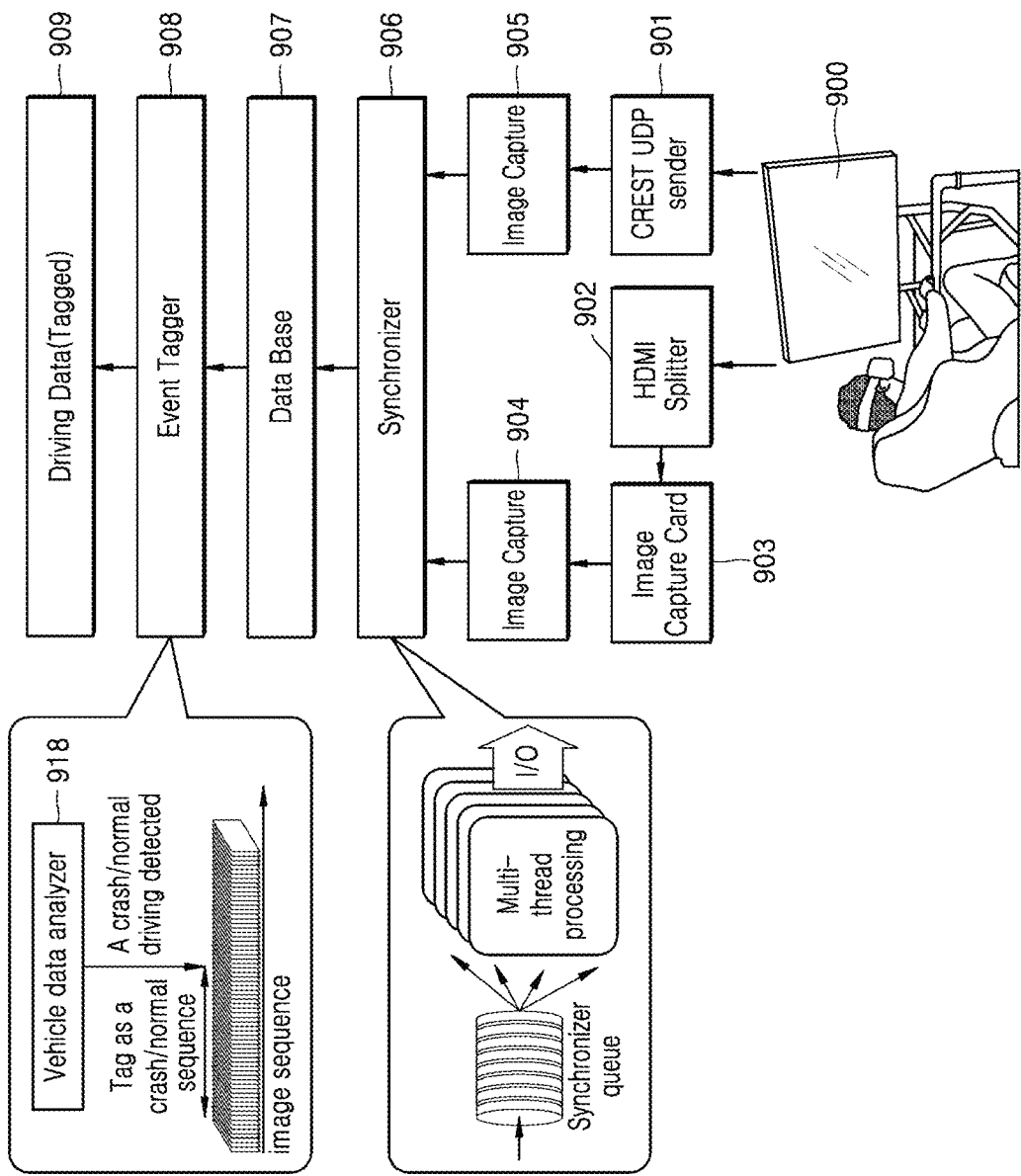
FIG. 9 is a diagram illustrating an example of obtaining driving data of a vehicle using virtual reality, according to an embodiment.

FIG. 9 is a diagram illustrating an example of obtaining vehicle driving data using virtual reality, according to an embodiment.

According to an embodiment, the electronic device 1000 may be a driving simulator system configured to detect an event of a vehicle using a virtual reality and a real time vehicle analysis program. According to an embodiment, the electronic device 1000 may efficiently obtain data which is difficult to predict in a real life, such as an accident, using a virtual environment.

According to an embodiment, the electronic device 1000 may efficiently obtain driving data, by detecting an object having a consistent pattern, such as a road, a building, or the like, and an object having a non-consistent pattern, such as a speed of a driving vehicle, a distance between the driving vehicle and another vehicle, or the like, using a driving simulation device 900.

According to an embodiment, the electronic device 1000 may obtain the driving data of the vehicle in the perspective of a driver using the driving simulation device 900. According to an embodiment, the driving data of the vehicle in the perspective of the driver, obtained from the driving simulation device 900, may be transmitted to a CREST UDP sender 901 and an HDMI splitter 902.

According to an embodiment, the CREST UDP sender 901 may additionally send the driving data of the vehicle in the perspective of the driver to a driving data crawler 905 using a user datagram protocol (UDP).

According to an embodiment, the HDMI splitter 902 may distribute the driving data of the vehicle in the perspective of the driver to an image capture card 903, and the image capture card 903 may capture (904) frame images included in the driving data of the vehicle.

According to an embodiment, the electronic device 1000 may synchronize driving data from the driving data crawler 905 with the captured image received from the image capture card 903 in operation 906, and then may store the synchronized driving data and captured image in a database in operation 907. According to an embodiment, the electronic device 1000 may store driving data images in a database and manage the database.

According to an embodiment, the electronic device 1000 may detect an event from the driving data stored in the database in operation 908. According to an embodiment, the electronic device 1000 may detect an event occurring during driving of the vehicle by analyzing the driving data using a vehicle data analyzer 918.

According to an embodiment, the electronic device 1000 may generate a tag by classifying types of the events detected in operation 908. According to an embodiment, the electronic device 1000 may assign the generated tag as a label of the event.

As a result, the electronic device 1000 may obtain the plurality of events classified based on the types of the events, accuracy, or the like, in operation 909.

Thus, the electronic device 1000 may efficiently obtain the driving data including the plurality of events which are difficult to obtain in a reality, taking into account a state of the driving vehicle and states of other vehicles in a virtual driving environment having a certain pattern.

FIG. 10 is a chart illustrating an example of determining a notification message and a vehicle control command based on types of events, according to an embodiment.

According to an embodiment, when the electronic device 1000 processes an output of a first trained model such that the amount of operations is reduced and inputs the processed output in a second trained model, a notification message may be output. Alternatively, a control operation corresponding to an event may be output, or the control operation corresponding to the event along with the notification message may be output.

The electronic device 1000 may generate the notification message notifying about an event, based on determination of whether the event occurs.

According to an embodiment, different notification messages may be generated based on a type of an object, a sequential change in locations of the object, whether an event occurs, or the like.

When it is determined that an event occurs, the electronic device 1000 may generate a notification message notifying about the event. Also, when it is determined that an event does not occur, the electronic device 1000 may not generate a notification message notifying about the event. According to an embodiment, when the electronic device 1000 determines not to generate the notification message notifying about the event, the electronic device 1000 may not generate the notification message at all, or may generate a pre-set notification message not including notification of the event. For example, the electronic device 1000 may generate the notification message including at least one of a current temperature, an rpm value of a vehicle, an advancing direction of a vehicle, a traffic situation, and a level of risk of driving. According to an embodiment, the notification message not including the notification of the event may be set as a default value in the electronic device 1000.

According to an embodiment, the electronic device 1000 may generate the notification message based on types of events and the level of risk of driving. The notification message according to an embodiment may be generated as a text message or a voice message, but is not limited thereto. Also, for example, the message generated as text may be converted to speech via text to speech (TSS) to obtain a notification message of a voice format.

The electronic device 1000 may output the generated notification message. According to an embodiment, the notification message may be output as sound, text, an image, and/or vibration. According to an embodiment, the electronic device 1000 may display the notification message on a head up display (HUD) or a dashboard. According to an embodiment, when the notification message is of a voice format, the electronic device 1000 may display the notification message through a speaker of the vehicle. For example, the electronic device 1000 may transmit a command to control the speaker of the vehicle to output the notification message of the voice format, to the speaker of the vehicle.

According to an embodiment, a command to control an operation of a module mounted in the vehicle may be transmitted to the module, based on types of events and the level of risk of driving. When the electronic device 1000 determines that it had better control the operation of the module mounted in the vehicle based on the types of the events and the level of risk of driving, the electronic device 1000 may transmit the command to control the operation of the module mounted in the vehicle, to the module mounted in the vehicle. For example, the electronic device 1000 may output the notification message and at the same time control the operation of the module mounted in the vehicle, based on the types of the events and the level of risk of driving. Alternatively, when a user input for controlling the operation of the module mounted in the vehicle is not received within a pre-set time period after outputting the notification message, the electronic device 1000 may transmit the command for controlling the operation of the module mounted in the vehicle, to the module mounted in the vehicle. Alternatively, the electronic device 1000 may not output the notification message and may transmit the command for controlling the operation of the module mounted in the vehicle, to the module mounted in the vehicle, based on the types of the events and the level of risk of driving.

The user input according to an embodiment may include at least one of a step on input, a steering input, a voice input, a key input, a touch input, a bending input, and a multimodal input, but is not limited thereto. The step on input may denote a user input of stepping on the brake of a vehicle to control the brake. The steering input may denote a user input of rotating a steering wheel of a vehicle to control the steering wheel.

According to an embodiment, the notification message generated using the second trained model may vary based on the types of the events and the level of risk of driving. For example, content included in the notification message may vary based on the types of the events and the level of risk of driving. For example, the content included in the notification message may include notification of the event, an action guide corresponding to the event, an alarm sound, etc.

FIG. 10 is a table illustrating examples of how the content of the notification message and the content of the vehicle control command are determined based on the types of the events and the level of risk of driving. The table according to an embodiment is just an example, and a plurality of trained models may be continually modified and refined. Thus, output values based on input values in the plurality of trained models may be continually modified and refined. The electronic device 1000 may output different notification messages and different vehicle control commands based on the types of the events and the level of risk of driving, using the second trained model.

According to an embodiment, as illustrated in FIG. 10, for example, when the type of the event is a predicted accident due to a failure to assure a safe distance with respect to a vehicle in front and the level of risk of driving is high, the electronic device 1000 may generate the notification message including the content, "immediately step on the brake" which is an action guide corresponding to the event, together with an alarm sound. Also, the electronic device 1000 may generate the command to control a speed of a vehicle by operating the brake of the vehicle by applying a certain force to the brake.

Also, according to an embodiment, the electronic device 1000 may determine a time within which a user input for executing the action guide is to be received, based on the types of the events and the level of risk of driving. For example, the time within which the user input is to be received may be determined based on the level of risk of driving. Also, for example, the determination as to which data to use in order to determine the time within which the user input is to be received, may be set and changed based on learning based on a pre-set reference. For example, when it is determined that the level of risk of driving is high, and the user input for controlling the operation of the module mounted in the vehicle is not received within the pre-set time, the electronic device 1000 may transmit a command for controlling the operation of the module mounted in the vehicle, to the module mounted in the vehicle.

For example, when the type of the event is a change in terrain to include a winding path ahead and the level of risk of driving is middle, the electronic device 1000 may generate the notification message including the content, "caution, a winding road ahead," so that an action guide corresponding to the event is included in the notification message along with the notification of the event. Also, the electronic device 1000 may control a steering wheel by a certain angle, thereby generating a control command to change a moving direction of the vehicle.

For example, when the type of the event is a change in a road situation with a vehicle engaged in an accident in front and the level of risk of driving is low, the electronic device 1000 may generate the notification message including the content, "there is a vehicle ahead engaged in an accident, change the lane to the right side," so that an action guide corresponding to the event is included in the notification message along with the notification of the event. Also, the electronic device 1000 may generate a control command to change a direction of the steering wheel so as to avoid the vehicle engaged in the accident.

For example, when the type of the event is a change in a traffic signal from green to red and the level of risk of driving is high, the electronic device 1000 may generate the notification message including the content, "a change in the traffic signal, please stop," so that an action guide corresponding to the event is included in the notification message along with the notification of the event. Also, the electronic device 1000 may gradually operate the brake, thereby generating a control command to stop the vehicle at a stop line.

For example, when the type of the event is a change in a traffic signal from red to green and the level of risk of driving is low, the electronic device 1000 may generate the notification message including the content, "a change in the traffic signal, please start," so that an action guide corresponding to the event is included in the notification message along with the notification of the event. Also, the electronic device 1000 may gradually operate an accelerator, thereby generating a control command to start the vehicle.

Figure 11:
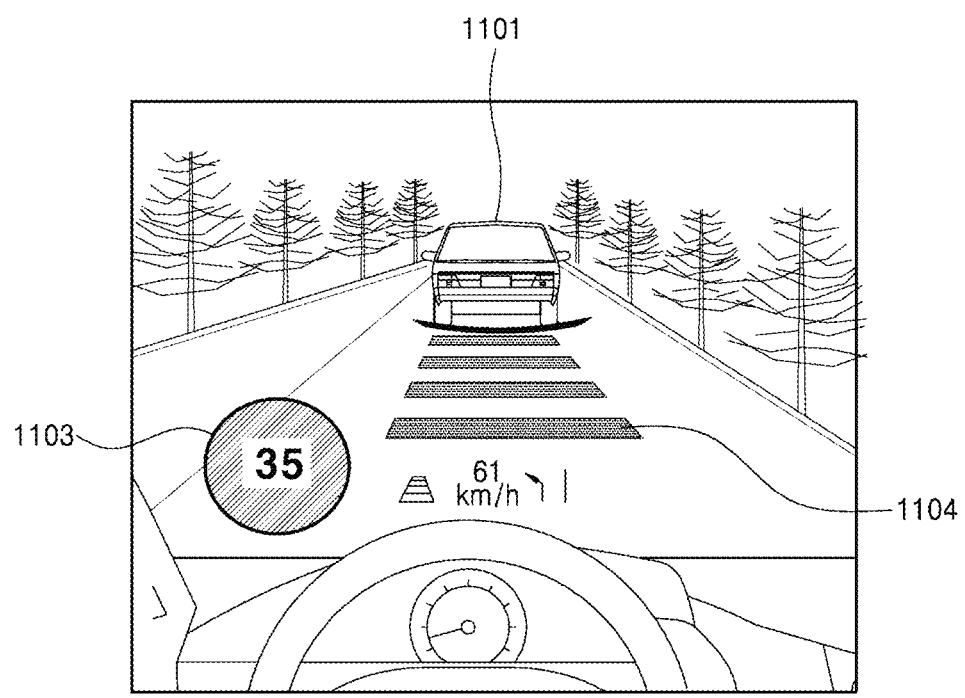
FIG. 11 is a diagram illustrating an example of outputting a notification message on a head-up display (HUD) of a vehicle, according to an embodiment.

FIG. 11 is a diagram illustrating an example of displaying the notification message on an HUD of a vehicle, according to an embodiment.

According to an embodiment, the electronic device 1000 may display the notification message on the HUD of the vehicle.

For example, when the electronic device 1000 determines that an event of a predicted accident occurs due to a failure to assure a safe distance with respect to a vehicle 1101 in front and the level 1103 of risk of driving is 35, the electronic device 1000 may control the HUD of the vehicle to display the notification message including the level 1103 of risk of driving and a virtual image 1104 for assuring a safe distance. Also, the electronic device 1000 may output the notification message including the content, "please immediately step on the brake," which is an action guide corresponding to the event, as a voice, along with an alarm sound. Also, for example, when the user's step on input of stepping on the brake is not received within a pre-set time period after outputting the notification message, the electronic device 1000 may transmit a command to control the operation of the brake to the brake. For example, the pre-set time period may be set based on learning, and may vary based on the level 1103 of risk of driving. For example, as the level 1103 of risk of driving increases, the pre-set time period may decrease. For example, when an accident is predicted to occur unless the brake is immediately stepped on due to a distance between the vehicle of the user and the vehicle 1101 in front being too small, the notification message may be output and at the same time the command to control the operation of the brake may be transmitted to the brake.

Figure 12:
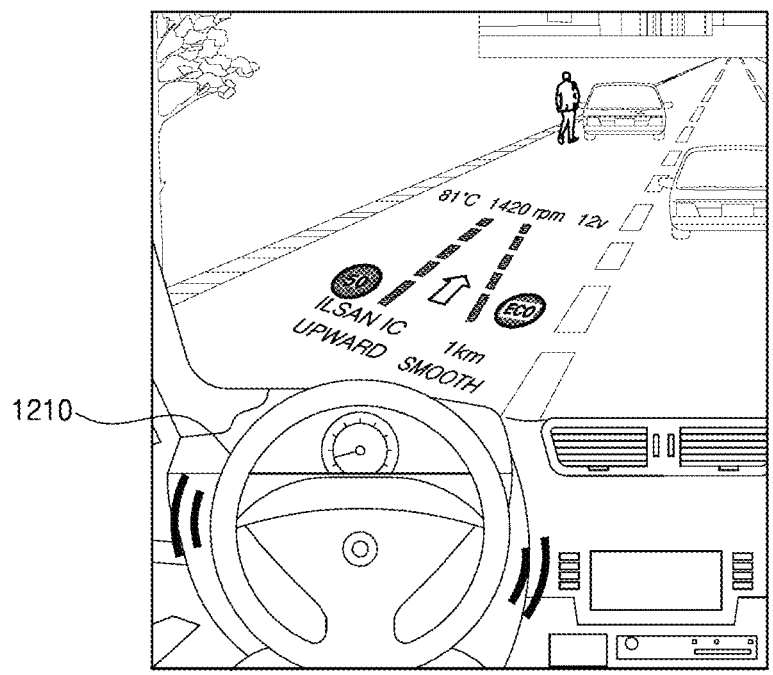
FIG. 12 is a diagram illustrating an example of outputting a notification message in a vehicle, according to an embodiment.

FIG. 12 is a diagram illustrating an example of displaying the notification message in a vehicle, according to an embodiment.

According to an embodiment, the electronic device 1000 may transmit a command for controlling an operation of a module mounted in the vehicle to the module mounted in the vehicle.

For example, when the electronic device 1000 determines that an event related to a change in a traffic situation occurs so that driving is not possible in a corresponding lane because of vehicles engaged in an accident ahead, the electronic device 1000 may control an HUD of the vehicle to display a pre-set notification message not including notification of the event. For example, the electronic device 1000 may display the notification message including at least one of a current temperature, an rpm value of the vehicle, an advancing direction of the vehicle, a traffic situation, and a level of risk of driving on the HUD. Also, the electronic device 1000 may output the notification message, "a vehicle ahead engaged in an accident, please change the lane to the right side," as a voice format. Also, for example, when a steering input of a user of rotating a steering wheel 1210 is not received from the user within a pre-set time period after outputting the notification message of the voice format, a command for rotating the steering wheel 1210 may be transmitted to the steering wheel 1210. Thus, the electronic device 1000 may induce the user to control the steering wheel 1210, or may transmit the command to control the steering wheel 1210 to the steering wheel 1210 so as to autonomously control a driving path.

Figure 13:
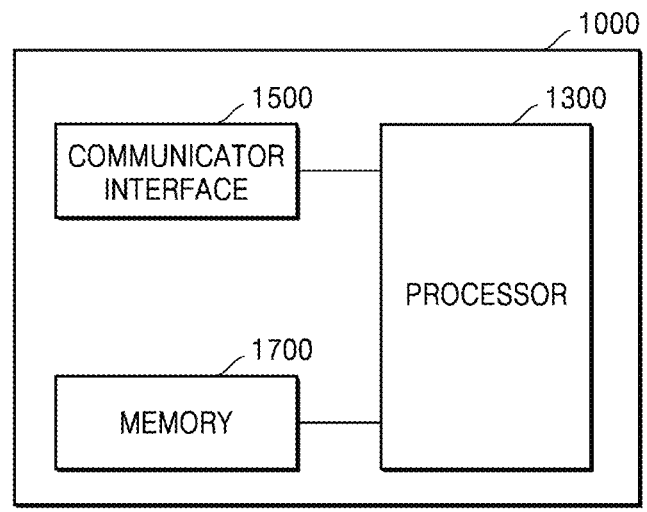
FIG. 13 is a block diagram illustrating components of an electronic device according to an embodiment.

FIG. 13 is a block diagram illustrating components of an electronic device 1000 according to an embodiment.

Figure 14:
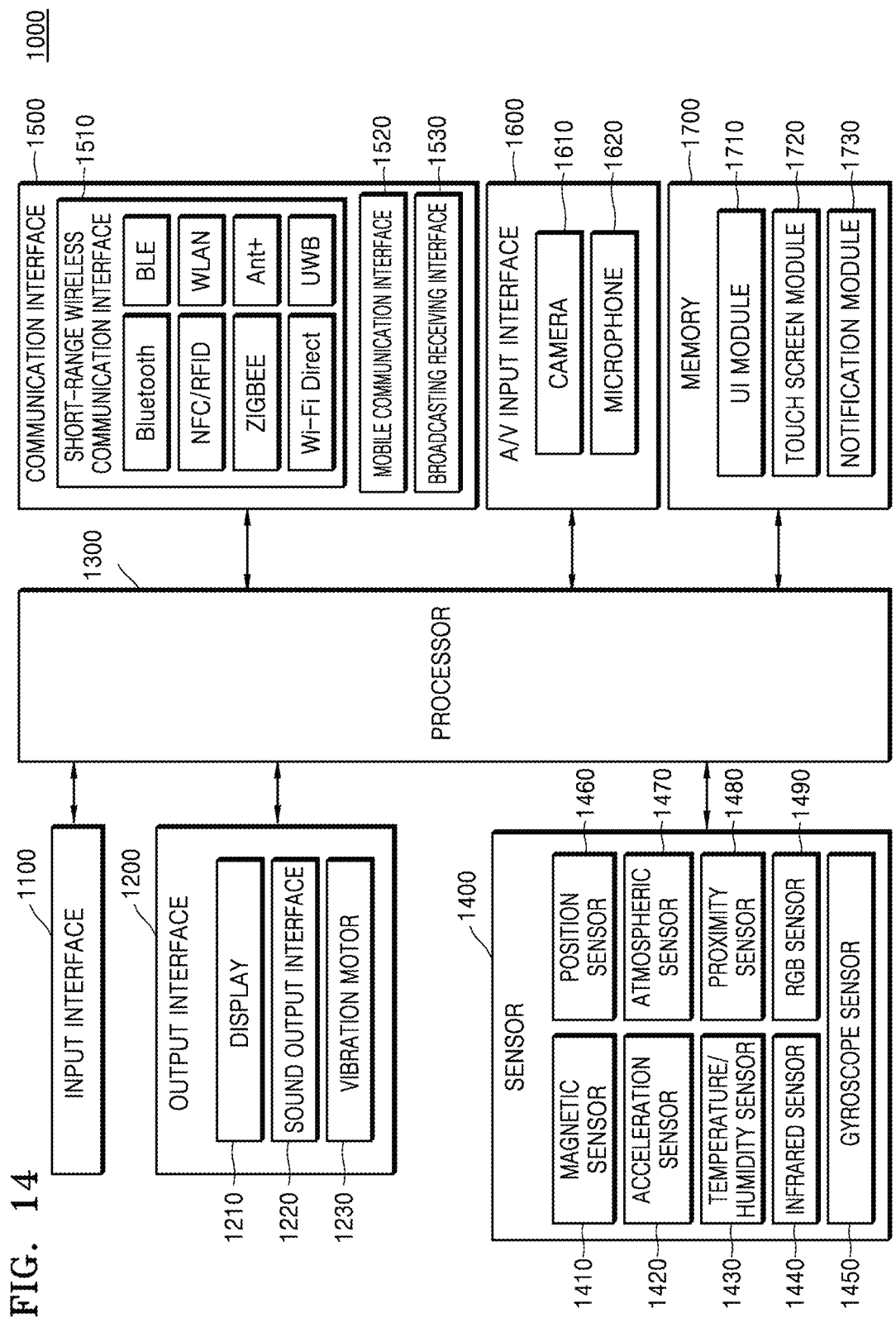
FIG. 14 is a block diagram illustrating components of an electronic device according to an embodiment.

FIG. 14 is a block diagram illustrating components of the electronic device 1000, according to an embodiment.

As illustrated in FIG. 13, the electronic device 1000 according to an embodiment may include a processor (e.g., including processing circuitry) 1300, a communication interface (e.g., including communication circuitry) 1500, and a memory 1700. However, not all components illustrated in FIG. 13 are essential components of the electronic device 1000. The electronic device 1000 may be implemented by including more or less than the components illustrated in FIG. 13.

For example, as illustrated in FIG. 14, the electronic device 1000 according to an embodiment may further include an input interface (e.g., including input circuitry) 1100, an output interface (e.g., including output circuitry) 1200, a sensor 1400, and an audio/video (NV) input interface (e.g., including A/V input circuitry) 1600, in addition to the processor 1300, the communication interface 1500, and the memory 1700.

For example, the electronic device 1000 according to an embodiment may be a vehicle board including the processor 1300, the communication interface 1500, and the memory 1700, and the electronic device 1000 according to an embodiment may be a vehicle further including at least one of the input interface 1100, the output interface 1200, the sensor 1400, and the A/V input interface 1600, in addition to the processor 1300, the communication interface 1500, and the memory 1700.

The input interface 1100 refers to a device including various input circuitry via which a user may input data for controlling the electronic device 1000. For example, the input interface 1100 may include various input circuitry, such as, for example, and without limitation, a key pad, a dome switch, a touch pad (using a touch capacitance method, a pressure resistance method, an infrared sensing method, a surface ultrasonic conductive method, an integral tension measuring method, a piezo effect method, etc.), a jog wheel, a jog switch, or the like, but is not limited thereto.

The input interface 1100 may receive an input for controlling an operation of a module mounted in a vehicle.

The output interface 1200 may include various circuitry to output an audio signal, a video signal, and/or a vibration signal, and may include a display 1210, a sound output interface (e.g., including sound output circuitry) 1220, and a vibration motor 1230. According to an embodiment, the output interface 1200 may output a notification message as an audio, a video, and/or vibration.

The display 1210 may display and output information processed in the electronic device 1000. For example, the display 1210 may display a notification message on a head up display (HUD) of a vehicle.

The sound output interface 1220 may include various circuitry to output audio data received from the communication interface 1500 or stored in the memory 1700. Also, the sound output interface 1220 may output a sound signal (for example, a call signal reception sound, a message reception sound, a notification sound) related to functions performed in the electronic device 1000. For example, the sound output interface 1220 may output an alarm sound for notifying about occurrence of an event.

The processor 1300 may include various processing circuitry and control general operations of the electronic device 1000, in general. For example, the processor 1300 may generally control the user input interface 1100, the output interface 1200, the sensor 1400, the communication interface 1500, the AN input interface 1600, or the like, by executing programs stored in the memory 1700. Also, the processor 1300 may perform the functions of the electronic device 1000, by executing the programs stored in the memory 1700. The processor 1300 may include at least one processor. The processor 1300 may include a plurality of processors or an integrated one processor, based on functions and operations thereof. According to an embodiment, the processor 1300 may include at least one processor configured to execute at least one program stored in the memory 1700 to provide a notification message.

According to an embodiment, the processor 1300 may obtain a video sequence including a plurality of frames from a camera mounted in a vehicle via the communication interface 1500. According to an embodiment, the processor 1300 may transmit a command configured to control an operation of a module mounted in a vehicle to the module mounted in the vehicle, based on a type of an event and a level of risk of driving the vehicle, via the communication interface 1500.

According to an embodiment, the processor 1300 may detect an object included in the plurality of frames, from the plurality of frames. According to an embodiment, the processor 1300 may recognize information about a location of the object, with respect to each of the plurality of frames, using coordinate information. The processor 1300 may determine the locations of the object in units of pixels. According to an embodiment, the processor 1300 may determine whether a driving event of a vehicle occurs by analyzing a sequential change with respect to the locations of the object in the plurality of frames. According to an embodiment, the processor 1300 may determine a type of the event and a level of risk of the driving of the vehicle, by analyzing the sequential change with respect to the locations of the object in the plurality of frames. According to an embodiment, the processor 1300 may generate a notification message for notifying about the event, based on the determination of whether the event occurs. According to an embodiment, the processor 1300 may generate the notification message for notifying about the event, based on the type of the event and the level of risk of the driving of the vehicle. According to an embodiment, the processor 1300 may control the output interface 1200 to output the generated notification message. According to an embodiment, the processor 1300 may control the display 1210 to display the generated notification message. According to an embodiment, the processor 1300 may detect the object, obtain the information about the locations of the object, determine whether the event occurs, and generate the notification message, using different trained models.

According to an embodiment, a first trained model may be generated by learning a reference for determining a type of an object and a reference for determining locations of the object in a plurality of frames, with respect to each of the plurality of frames, by adding coordinate information to an FCN. The processor 1300 may determine the type of the object using the first trained model and determine the locations of the object in the plurality of frames.

According to an embodiment, a second trained model may be generated by learning a reference for determining whether a driving event of a vehicle occurs by analyzing a sequential change with respect to locations of an object in a plurality of frames, using an RNN. The processor 1300 may determine whether the event related to the driving of the vehicle occurs and determine content of the notification message, using the second trained model.

According to an embodiment, the processor 1300 may apply a filter for flattening lightness degrees of the plurality of frames to the plurality of frames, in order to input the plurality of frames to the first trained model, and may reduce the dimension of an output of the first trained model to input the plurality of frames to the second trained model.

The sensor 1400 may include various sensors and sensing circuitry to sense a state of the electronic device 1000, a state of a user, or a state around the electronic device 1000, and may transmit sensed information to the processor 1300.

The sensor 1400 may include various sensing circuitry, such as, for example, and without limitation, at least one of a magnetic sensor 1410, an acceleration sensor 1420, a temperature/humidity sensor 1430, an infrared sensor 1440, a gyroscope sensor 1450, a position sensor (for example, global positioning system (GPS)) 1460, an atmospheric sensor 1470, a proximity sensor 1480, and an RGB sensor 1490, but is not limited thereto. A function of each sensor may be intuitively inferred by one of ordinary skill in the art from its name, and thus, its detailed description will be omitted.

The communication interface 1500 may include various communication circuitry including at least one component configured to enable the electronic device 1000 to communicate with another electronic device (not shown) and a server 2000. The other electronic device may be a computing device or a sensor, but is not limited thereto. Also, for example, the other electronic device may be a module included in the vehicle together with the electronic device 1000. For example, the communication interface 1500 may include a short-range wireless communication interface 1510, a mobile communication interface 1520, and a broadcasting receiving interface 1530.

The short-range wireless communication interface 1510 may include a Bluetooth communication interface, a Bluetooth low energy communication interface, a near-field communication interface (NFC/RFID), a WLAN (Wi-fi) communication interface, a Zigbee communication interface, an infrared data association (IrDA) communication interface (not shown), a Wi-fi direct (WFD) communication interface, a ultra wideband (UWB) communication interface, an Ant+communication interface, or the like, but is not limited thereto.

The mobile communication interface 1520 may include various mobile communication circuitry to transmit and receive a wireless signal to and from at least one of a base station, an external terminal, and a server, in a mobile communication network. Here, the wireless signal may include a voice call signal, a videotelephony call signal, or data of various types based on exchanging of text/multimedia messages.

The broadcasting receiving interface 1530 may include various broadcast receiving circuitry to receive a broadcasting signal and/or information related to broadcasting from the outside, via a broadcasting channel. The broadcasting channel may include a satellite channel and a ground-wave channel. According to embodiments, the electronic device 1000 may not include the broadcasting receiving interface 1530.

According to an embodiment, the communication interface 1500 may receive the video sequence including the plurality of frames from the camera mounted in the vehicle. According to an embodiment, the communication interface 1500 may transmit the command for controlling an operation of a module mounted in the vehicle to the module mounted in the vehicle.

The A/V input interface 1600 may include various A/V interface circuitry and is configured to input an audio signal or a video signal, and may include a camera 1610, a microphone 1620, or the like. The camera 1610 may obtain an image frame, such as a still image or a video, via an image sensor, in a videotelephony mode or a photographing mode. The image captured by the image sensor may be processed by the processor 1300 or an additional image processor (not shown). For example, the image captured by the camera 1610 may be used as information for determining whether an event occurs.

The microphone 1620 may receive an external sound signal and process the external sound signal as electrical sound data. For example, the microphone 1620 may receive the sound signal from an external device or the user. The microphone 1620 may use various noise-removal algorithms to remove noise generated in a process of receiving the external sound signal.

The memory 1700 may store programs for the processing and controlling operations of the processor 1300, and may store data that is input to the electronic device 1000 or output from the electronic device 1000.

The memory 1700 may include at least one type of storage medium from among a flash memory type, a hard disk type, a multimedia card micro type, a card type memory (for example, SD or XD memory), random-access memory (RAM), static RAM (SRAM), read-only memory (ROM), electrically erasable programmable ROM (EEPROM), programmable ROM (PROM), magnetic memory, magnetic disk, and optical disk.

The programs stored in the memory 1700 may be divided into a plurality of modules based on their functions. For example, the programs may be divided into a user interface (UI) module 1710, a touch screen module 1720, and a notification module 1730.

The UI module 1710 may provide a specialized UI, a graphic user interface (GUI), etc., which are synchronized to the electronic device 1000, for each application. The touch screen module 1720 may sense a touch gesture on a touch screen via the user, and transmit information related to the touch gesture to the processor 1300. The touch screen module 1720 according to an embodiment may recognize and analyze a touch code. The touch screen module 1720 may be implemented as additional hardware including a processor.

The notification module 1730 may generate a signal to notify about occurrence of an event. The notification module 1730 may output the notification signal as a video signal via the display 1210, output the notification signal as an audio signal via the sound output interface 1220, or output the notification signal as a vibration signal via the vibration motor 1230.

Figure 15:
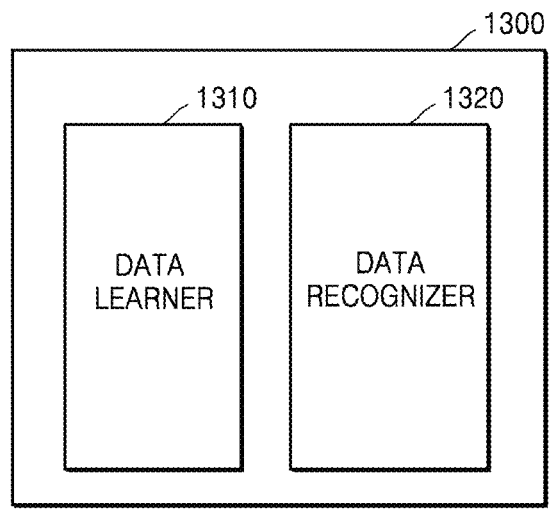
FIG. 15 is a block diagram illustrating a processor according to an embodiment.

FIG. 15 is a block diagram illustrating components of the processor 1300 according to an embodiment.

Referring to FIG. 15, the processor 1300 may include a data learner (e.g., including processing circuitry and/or program elements) 1310 and a data recognizer (e.g., including processing circuitry and/or program elements) 1320.

The data learner 1310 may include various processing circuitry and/or program elements and learn a reference for recognizing a location of an object using coordinate information. The data learner 1310 may learn a reference with respect to which data to use to recognize the location of the object using the coordinate information, how to use the data to obtain the location information, and how to determine whether the event occurs. The data learner 1310 may learn the reference for recognizing the location of the object using the coordinate information, by obtaining data to be used for learning and applying the obtained data to a data recognition model to be described below.

According to an embodiment, operations of detecting the object, recognizing the location information of the object, determining the type of the object, determining the locations of the object, determining whether the event occurs, determining the type of the event, determining the level of risk of the driving of the vehicle, generating the notification message, generating the vehicle control command, or the like, may be performed as separate operations. However, embodiments are not limited thereto. At least two of the operations of detecting the object, recognizing the location information of the object, determining the type of the object, determining the locations of the object, determining whether the event occurs, determining the type of the event, determining the level of risk of the driving of the vehicle, generating the notification message, generating the vehicle control command, or the like, may be performed based on learning based on a pre-set reference.

The data recognizer 1320 may include various processing circuitry and/or program elements and recognize the location information of the object based on data and determine whether an event occurs based on the recognition of the location information. The data recognizer 1320 may recognize the location information of the object based on certain data, using a learned data recognition model. The data recognizer 1320 may obtain certain data based on a pre-set reference based on learning and use the data recognition model with the obtained data as an input value, in order to determine how to obtain the location information of the object based on certain data and how to generate the notification message and the vehicle control command based on whether the event occurs. Also, a result value output by the data recognition model using the obtained data as the input value may be used to modify and refine the data recognition model.

At least one of the data learner 1310 and the data recognizer 1320 may be manufactured as at least one hardware chip and may be mounted in an electronic device. For example, at least one of the data learner 1310 and the data recognizer 1320 may be manufactured as an exclusive hardware chip for AI or as part of a previous general-purpose processor (for example, a central-processing unit (CPU) or an application processor) or a graphic exclusive processor (for example, a graphic-processing unit (GPU)), and may be mounted in various electronic devices described above.

In this case, the data learner 1310 and the data recognizer 1320 may be mounted in the same electronic device or each may be mounted in a different electronic device. For example, one of the data learner 1310 and the data recognizer 1320 may be included in the electronic device 1000, and the other may be included in the server 2000 (see, e.g., FIG. 18). Also, the data learner 1310 and the data recognizer 1320 may be connected to each other in wires or wirelessly, so that model information established by the data learner 1310 may be provided to the data recognizer 1320, or data which is input to the data recognizer 1320 may be provided to the data learner 1310 as additional learning data.

Meanwhile, at least one of the data learner 1310 and the data recognizer 1320 may be implemented as a software module comprising various program elements. When at least one of the data learner 1310 and the data recognizer 1320 is implemented as a software module (or a program module including instructions), the software module may be stored in a non-transitory computer-readable recording medium. Also, in this case, one or more software modules may be provided by an operating system (OS) or a predetermined application. Some of the one or more software modules may be provided by the OS and the others may be provided by a predetermined application.

Figure 16:
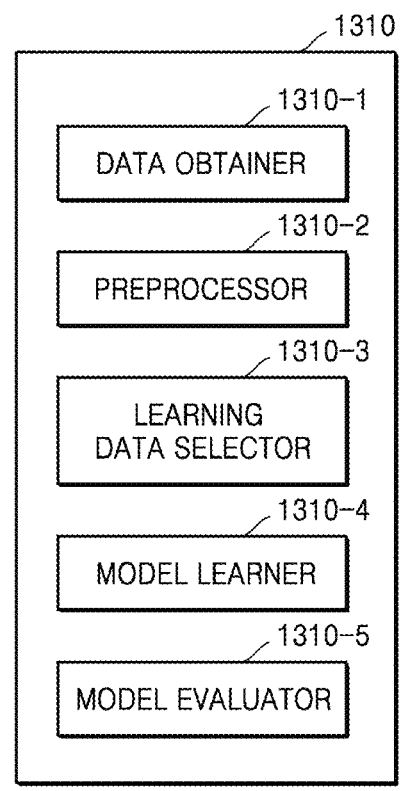
FIG. 16 is a block diagram illustrating a data learner according to an embodiment.

FIG. 16 is a block diagram illustrating the data learner 1310 according to an embodiment.

Referring to FIG. 16, the data learner 1310 according to embodiments may include a data obtainer (e.g., including processing circuitry and/or program elements) 1310-1, a preprocessor (e.g., including processing circuitry and/or program elements) 1310-2, a learning data selector (e.g., including processing circuitry and/or program elements) 1310-3, a model learner (e.g., including processing circuitry and/or program elements) 1310-4, and a model evaluator (e.g., including processing circuitry and/or program elements) 1310-5.

The data obtainer 1310-1 may include various processing circuitry and/or program elements and obtain data which is necessary to determine how to use the coordinate information to obtain the location information of the object and how to determine whether an event occurs. The data obtainer 1310-1 may obtain the data which is necessary for learning configured to determine how to use the coordinate information to obtain the location information of the object and how to determine whether an event occur.

For example, the data obtainer 1310-1 may obtain voice data, image data, text data, or bio-signal data. For example, the data obtainer 1310-1 may receive the data via an input device (for example, a microphone, a camera, a sensor, etc.) of the electronic device 1000. Alternatively, the data obtainer 1310-1 may obtain the data via another electronic device communicating with the electronic device 1000. Alternatively, the data obtainer 1310-1 may obtain the data via the server 2000 communicating with the electronic device 1000.

For example, the data obtainer 1310-1 may receive the video sequence from a camera mounted in the vehicle. Also, for example, the data obtainer 1310-1 may receive the video sequence from a camera configured to capture a surrounding environment of the vehicle. Also, for example, the data obtainer 1310-1 may obtain the video sequence from a camera included in the electronic device 1000.

The preprocessor 1310-2 may include various processing circuitry and/or program elements and preprocess the obtained data so that the obtained data may be used in a learning operation for determining how to obtain pixel information and how to generate the notification message. The preprocessor 1310-2 may process the obtained data in a pre-set format so that the obtained data may be used in the learning operation for determining how to obtain pixel information and how to generate the notification message. For example, the preprocessor 1310-2 may perform preprocessing, whereby a filter configured to flatten lightness degrees of the plurality of frames included in the video sequence is applied to the plurality of frames.

The learning data selector 1310-3 may include various processing circuitry and/or program elements and select data which is necessary for the learning, from the preprocessed data. The selected data may be provided to the model learner 1310-4. The learning data selector 1310-3 may select the data which is necessary for the learning, from the preprocessed data, based on a predetermined reference for determining how to obtain the pixel information and how to generate the notification message. Also, the learning data selector 1310-3 may select the data, based on a reference that is predetermined based on the learning by the model learner 1310-4.

The model learner 1310-4 may include various processing circuitry and/or program elements and learn the reference with respect to how to obtain the location information of the object based on learning data and how to determine whether an event occurs. Also, the model learner 1310-4 may learn the reference with respect to how to obtain the location information of the object using the coordinate information and which learning data to use to determine whether an event occurs.

Also, the model learner 1310-4 may train the data recognition model used to determine how to obtain the location information of the object using the coordinate information based on the learning data and how to determine whether an event occurs. In this case, the data recognition model may be a pre-established model. For example, the data recognition model may be a model that is pre-established by receiving basic learning data (for example, a black box image of a vehicle, etc.)

The data recognition model may be established by taking into account a field in which the data recognition model is implemented, a purpose of learning, a computer performance of a device, or the like. The data recognition model may include, for example, a model based on a neural network. For example, models, such as a deep neural network (DNN), an RNN, and a bidirectional recurrent deep neural network (BRDNN) may be used as the data recognition model, but the present disclosure is not limited thereto.

According to various embodiments, when there are a plurality of pre-established data recognition models, the model learner 1310-4 may determine a data recognition model, of which basic learning data has high relativity with learning data that is input, as the data recognition model for learning. In this case, the basic learning data may be pre-classified based on a type of data, and the data recognition model may be pre-established based on a type of data. For example, the basic learning data may be pre-classified based on various references, such as a region in which the learning data is generated, a time in which the learning data is generated, a volume of the learning data, a genre of the learning data, a generator of the learning data, etc.

Also, the model learner 1310-4 may train the data recognition model, for example, using learning algorithms, such as error back-propagation or gradient descent.

Also, the model learner 1310-4 may train the data recognition model, for example, via supervised learning having learning data as an input. Also, the model learner 1310-4 may train the data recognition model, for example, via unsupervised learning in which a reference for determining how to obtain the location information of the object using the coordinate information based on the learning data and how to determine whether an event occurs is discovered by learning on its own types of data which are necessary to determine how to obtain the location information of the object using the coordinate information based on the learning data and how to determine whether an event occurs, without instructions. Also, the model learner 1310-4 may train the data recognition model, for example, via reinforcement learning using feedback with respect to whether a result of determining how to obtain the location information of the object using the coordinate information based on the learning data and a result of determining how to determine whether an event occurs, based on the learning, are correct.

Also, when the data recognition model is learned, the model learner 1310-4 may store the learned data recognition model. In this case, the model learner 1310-4 may store the learned data recognition model in a memory of the electronic device 1000 including the data recognizer 1320. Alternatively, the model learner 1310-4 may store the learned data recognition model in a memory of the server 2000 connected with the electronic device 1000 via a wired or wireless network.

In this case, for example, the memory in which the learned data recognition model is stored may also store a command or data associated with at least one another component of the electronic device 1000. Also, the memory may store software and/or a program. The program may include, for example, kernel, middleware, an application programming interface (API), and/or an application program (or an "application").

The model evaluator 1310-5 may include various processing circuitry and/or program elements and input evaluation data to the data recognition model, and when a result of recognition, which is output from the evaluation data, does not meet a predetermined reference, may allow the model learner 1310-4 to learn again. In this case, the evaluation data may be data which is predetermined for evaluating the data recognition model.

For example, when the number or a ratio of pieces of the evaluation data, with respect to which the recognition results are not correct, from among the recognition results of the learned data recognition model with respect to the evaluation data, is greater than a predetermined threshold value, the model evaluator 1310-5 may evaluate such a case as not meeting a predetermined reference criterion. For example, when the predetermined threshold value is defined as a rate of 2%, and when the learned data recognition model outputs wrong recognition results with respect to more than 20 pieces of the evaluation data from among the total 1000 pieces of the evaluation data, the model evaluator 1310-5 may evaluate that the learned data recognition model is not appropriate.

Meanwhile, when there are a plurality of learned data recognition models, the model evaluator 1310-5 may evaluate whether each of the learned data recognition models meets a predetermined reference criterion, and may determine a learned data recognition model meeting the predetermined reference criterion as an ultimate data recognition model. In this case, when there are a plurality of learned data recognition models meeting the predetermined reference criterion, the model evaluator 1310-5 may determine any one or a predetermined number of learned data recognition models as the ultimate data recognition model, in a descending order of evaluation scores.

Meanwhile, at least one of the data obtainer 1310-1, the preprocessor 1310-2, the learning data selector 1310-3, the model learner 1310-4, and the model evaluator 1310-5 in the data learner 1310 may be manufactured as at least one hardware chip and may be mounted in the electronic device 1000. For example, at least one of the data obtainer 1310-1, the preprocessor 1310-2, the learning data selector 1310-3, the model learner 1310-4, and the model evaluator 1310-5 may be manufactured as an exclusive hardware chip for AI or as part of a previous general-purpose processor (for example, a CPU or an application processor) or a graphic exclusive processor (for example, a GPU), and may be mounted in various electronic devices described above.

Also, the data obtainer 1310-1, the preprocessor 1310-2, the learning data selector 1310-3, the model learner 1310-4, and the model evaluator 1310-5 may be mounted in one electronic device or each may be mounted in a different electronic device. For example, some of the data obtainer 1310-1, the preprocessor 1310-2, the learning data selector 1310-3, the model learner 1310-4, and the model evaluator 1310-5 may be included in the electronic device 1000, and the others may be included in the server 2000.

Also, at least one of the data obtainer 1310-1, the preprocessor 1310-2, the learning data selector 1310-3, the model learner 1310-4, and the model evaluator 1310-5 may be implemented as a software module. When at least one of the data obtainer 1310-1, the preprocessor 1310-2, the learning data selector 1310-3, the model learner 1310-4, and the model evaluator 1310-5 is implemented as a software module (or a program module including instructions), the software module may be stored in a non-transitory computer-readable recording medium. Also, in this case, one or more software modules may be provided by an OS or a predetermined application. Alternatively, some of the one or more software modules may be provided by the OS and the others may be provided by a predetermined application.

Figure 17:
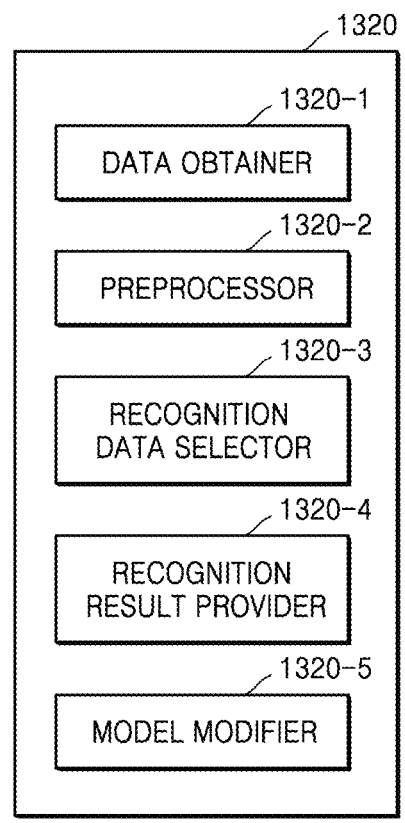
FIG. 17 is a block diagram illustrating a data recognizer according to an embodiment.

FIG. 17 is a block diagram illustrating the data recognizer 1320 according to an embodiment.

Referring to FIG. 17, the data recognizer 1320 according to an embodiment may include a data obtainer (e.g., including processing circuitry and/or program elements) 1320-1, a preprocessor (e.g., including processing circuitry and/or program elements) 1320-2, a recognition data selector (e.g., including processing circuitry and/or program elements) 1320-3, a recognition result provider (e.g., including processing circuitry and/or program elements) 1320-4, and a model modifier (e.g., including processing circuitry and/or program elements) 1320-5.

The data obtainer 1320-1 may include various processing circuitry and/or program elements and obtain data which is necessary for determining how to obtain the location information of the object based on the learning data and how to determine whether an event occurs.

The preprocessor 1320-2 may include various processing circuitry and/or program elements and preprocess the obtained data so that the obtained data may be used to determine how to obtain the location information of the object based on the learning data and how to determine whether an event occurs. The preprocessor 1320-2 may process the obtained data in a predetermined format so that the recognition result provider 1320-4 to be described below may use the obtained data to determine how to obtain the location information of the object based on the learning data and how to determine whether an event occurs The recognition data selector 1320-3 may include various processing circuitry and/or program elements and select data which is necessary to determine how to obtain the location information of the object based on the learning data and how to determine whether an event occurs, from the preprocessed data. The selected data may be provided to the recognition result provider 1320-4. The recognition data selector 1320-3 may select part or all of the preprocessed data, based on a predetermined reference for determining how to obtain the location information of the object based on the learning data and how to determine whether an event occurs. Also, the recognition data selector 1320-3 may select the data based on a reference predetermined based on the learning by the model learner 1310-4 described above.

The recognition result provider 1320-4 may include various processing circuitry and/or program elements and apply the selected data to the data recognition model, in order to determine how to obtain pixel information and how to generate the notification message. The recognition result provider 1320-4 may provide a recognition result based on a purpose of data recognition. The recognition result provider 1320-4 may apply the selected data to the data recognition model using the data selected by the recognition data selector 1320-3 as an input. Also, the recognition result may be determined by the data recognition model.

The model modifier 1320-5 may include various processing circuitry and/or program elements and allow the data recognition model to be modified and refined, based on an evaluation of the recognition result provided by the recognition result provider 1320-4. For example, the model modifier 1320-5 may provide the recognition result provided by the recognition result provider 1320-4 to the model learner 1310-4 so that the model learner 1310-4 may modify and refine the data recognition model.

Meanwhile, at least one of the data obtainer 1320-1, the preprocessor 1320-2, the recognition data selector 1320-3, the recognition result provider 1320-4, and the model modifier 1320-5 in the data recognizer 1320 may be manufactured as at least one hardware chip and may be mounted in the electronic device 1000. For example, at least one of the data obtainer 1320-1, the preprocessor 1320-2, the recognition data selector 1320-3, the recognition result provider 1320-4, and the model modifier 1320-5 may be manufactured as an exclusive hardware chip for AI or as part of a previous general-purpose processor (for example, a CPU or an application processor) or a graphic exclusive processor (for example, a GPU), and may be mounted in various electronic devices described above.

Also, the data obtainer 1320-1, the preprocessor 1320-2, the recognition data selector 1320-3, the recognition result provider 1320-4, and the model modifier 1320-5 may be mounted in one electronic device or each may be mounted in a different electronic device. For example, some of the data obtainer 1320-1, the preprocessor 1320-2, the recognition data selector 1320-3, the recognition result provider 1320-4, and the model modifier 1320-5 may be included in the electronic device 1000, and the others may be included in the server 2000.

Also, at least one of the data obtainer 1320-1, the preprocessor 1320-2, the recognition data selector 1320-3, the recognition result provider 1320-4, and the model modifier 1320-5 may be implemented as a software module. When at least one of the data obtainer 1320-1, the preprocessor 1320-2, the recognition data selector 1320-3, the recognition result provider 1320-4, and the model modifier 1320-5 is implemented as a software module (or a program module including instructions), the software module may be stored in a non-transitory computer-readable recording medium. Also, in this case, one or more software modules may be provided by an OS or a predetermined application. Alternatively, some of the one or more software modules may be provided by the OS and the others may be provided by a predetermined application.

Figure 18:
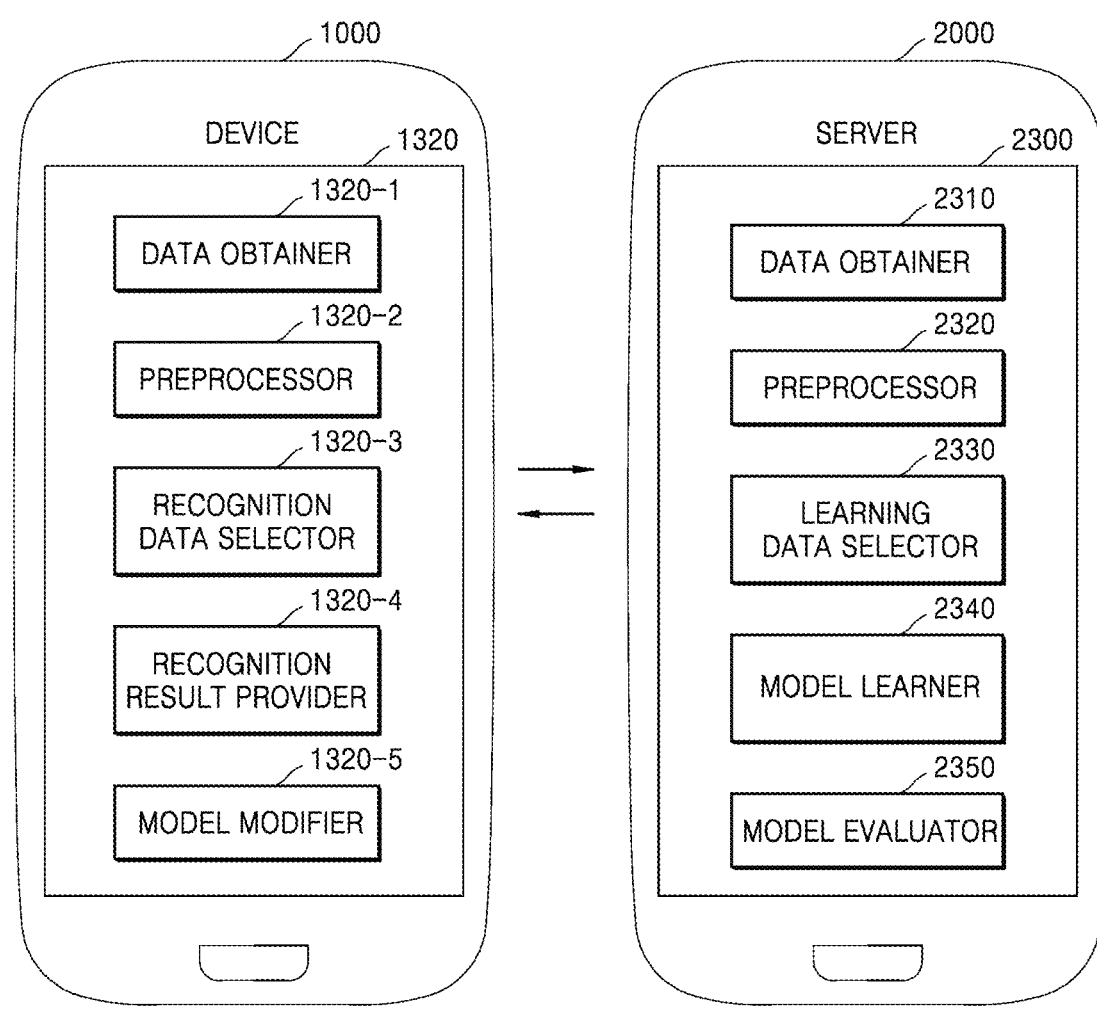
FIG. 18 is a diagram illustrating an example in which an electronic device and a server are synchronized to each other to learn and recognize data, according to an embodiment.

FIG. 18 is a diagram illustrating an example in which the electronic device 1000 and the server 2000 are synchronized to each other to learn and recognize data, according to an embodiment.

Referring to FIG. 18, the server 2000 may learn the reference for determining how to obtain the location information of the object and how to determine whether an event occurs. The electronic device 1000 may determine how to obtain the location information of the object and how to determine whether an event occurs, based on a result of the learning of the server 2000.

In this case, a model learner 2340 of the server 2000 may include various processing circuitry and/or program elements and perform the function of the data learner 1310 illustrated in FIG. 16. The model learner 2340 of the server 2000 may learn the reference with respect to which data to use to determine how to obtain the location information of the object and how to determine whether an event occurs, and the reference for determining how to obtain the location information of the object and how to determine whether an event occurs using the data. The model learner 2340 may learn the reference for determining how to obtain the location information of the object and how to determine whether an event occurs, by obtaining data to be used for learning and applying the obtained data to the data recognition model.

Also, the recognition result provider 1320-4 of the electronic device 1000 may include various processing circuitry and/or program elements and apply the data selected by the recognition data selector 1320-3 to the data recognition model generated by the server 2000, in order to determine how to obtain the location information of the object and how to determine whether an event occurs. For example, the recognition result provider 1320-4 may include various processing circuitry and/or program elements and transmit the data selected by the recognition data selector 1320-3 to the server 2000, and may request the server 2000 to apply the data selected by the recognition data selector 1320-3 to the data recognition model in order to determine how to obtain the pixel information and how to generate the notification message. Also, the recognition result provider 1320-4 may include various processing circuitry and/or program elements and receive information about the determination via the server 2000 as to how to obtain the location information of the object and how to determine whether an event occurs, from the server 2000.

The recognition result provider 1320-4 of the electronic device 1000 may receive the data recognition model generated by the server 2000, from the server 2000, and may determine how to obtain the location information of the object and how to determine whether an event occurs using the received data recognition model. In this case, the recognition result provider 1320-4 of the electronic device 1000 may determine how to obtain the location information of the object and how to determine whether an event occurs by applying the data selected by the recognition data selector 1320-3 to the data recognition model received from the server 2000.

Some embodiments may be realized via a recording medium including a computer-executable instruction, such as a program module executed by a computer. A computer-readable recording medium may be an arbitrary available medium accessible by a computer, and examples thereof include all volatile and non-volatile media and separable and non-separable media. Further, examples of the computer-readable recording medium may include a computer storage medium and a communication medium. Examples of the computer storage medium include all volatile and non-volatile media and separable and non-separable medial, which have been implemented by an arbitrary method or technique, for storing information such as computer-readable instructions, data structures, program modules, and other data.

Also, in this disclosure, the "interface" may include a hardware component, such as a processor or a circuit, and/or a software component executed by the hardware component such as the processor.

While the present disclosure has been illustrated and described with reference to various example embodiments thereof, it will be understood by one of ordinary skill in the art that various changes in form and details may be made therein without departing from the spirit and scope of the present disclosure as defined by the following claims. Hence, it will be understood that the embodiments described above are not limiting of the scope of the disclosure. For example, each component described in a single type may be executed in a distributed manner, and components described distributed may also be executed in an integrated form.

The scope of the present disclosure is indicated by the claims rather than by the detailed description of the disclosure, and it should be understood that the claims and all modifications or modified forms drawn from the concept of the claims are included in the scope of the present disclosure.

What is claimed is:

1. An electronic device comprising:
a processor; and
a memory for storing instructions executable by the processor,
wherein the processor is configured to execute the instructions to cause the electronic device to:
obtain, from a vehicle, a video sequence comprising a plurality of frames captured while driving the vehicle,
recognize a location of an object in at least one of the plurality of frames,
analyze a sequential change with respect to the location of the object in the plurality of frames, and
determine whether a driving event of the vehicle occurs,
wherein the processor is further configured to execute the instructions to cause the electronic device to:
detect a learning object from a video sequence comprising a plurality of learning frames captured while driving a learning vehicle and simultaneously map coordinate information to the learning object to obtain a first trained model based on a result of learning a location of the learning object, the location corresponding to the coordinate information of the learning object in the plurality of learning frames, and
recognize the location of the object in the at least one of the plurality of frames using the obtained first trained model.

2. The electronic device of claim 1, wherein
the processor is further configured to execute the instructions to cause the electronic device to:
determine a type of the object, and
determine whether the object is noise by comparing information about a reference size of the type of the object in the recognized location of the object with information about a size of the type of the object in the recognized location of the object.

3. The electronic device of claim 2, wherein the information about the size comprises information in which a range of an area to be occupied by the object in the plurality of frames is predefined based on a distance between the vehicle and the object.

4. The electronic device of claim 1, wherein the electronic device is configured to generate the first trained model by learning a reference for determining a level of importance based on a location of a learning object in at least one of a plurality of learning frames using coordinate information added to a fully convolutional network (FCN).

5. The electronic device of claim 1, wherein the processor is further configured to execute the instructions to cause the electronic device to:
recognize the location of the object in the plurality of frames in units of pixels.

6. The electronic device of claim 1, wherein the processor is further configured to execute the instructions to cause the electronic device to:
apply, to the plurality of frames, a filter configured to flatten lightness degrees of the plurality of frames to input the plurality of frames to the first trained model.

7. The electronic device of claim 1, wherein the processor is further configured to execute the instructions to cause the electronic device to:
determine a moving speed and a moving direction of the object based on the sequential change with respect to the location of the object in the plurality of frames, and
determine a type of the driving event of the vehicle and a level of risk of driving the vehicle based on the moving speed and the moving direction of the object.

8. The electronic device of claim 7, wherein the processor is further configured to execute the instructions to cause the electronic device to:
generate a command to control the driving of the vehicle based on the determined type of the driving event of the vehicle and the determined level of risk of driving the vehicle.

9. The electronic device of claim 8, wherein the processor is further configured to execute the instructions to cause the electronic device to:
automatically control the driving of the vehicle by automatically executing the command to control the driving of the vehicle, when the level of risk of driving the vehicle is equal to or greater than a critical value.

10. The electronic device of claim 7, wherein the processor is further configured to execute the instructions to cause the electronic device to:
output a notification message about the driving event based on the type of the driving event and the level of risk of driving the vehicle.

11. The electronic device of claim 10, wherein the processor is further configured to execute the instructions to cause the electronic device to:
display the notification message on a head up display (HUD) of the vehicle.

12. The electronic device of claim 1, wherein the processor is further configured to execute the instructions to cause the electronic device to:
determine, as a numeral value, a possibility of occurrence of the driving event of the vehicle when a plurality of objects are detected in the plurality of frames, the driving event being based on each of the plurality of objects.

13. The electronic device of claim 1, wherein the processor is further configured to execute the instructions to cause the electronic device to:
obtain a second trained model based on a result of learning whether a driving event of a learning vehicle occurs based on a sequential change with respect to a location of a learning object in a plurality of learning frames using a recurrent neural network (RNN), and
determine whether the driving event of the vehicle with respect to the object occurs using the obtained second trained model.

14. The electronic device of claim 1, wherein the processor is further configured to execute the instructions to cause the electronic device to:
obtain driving data of a learning vehicle from a virtual simulation device comprising virtual simulation circuitry, wherein the driving data of the learning vehicle comprises at least one of: a driving image captured while driving the learning vehicle, information about the virtual simulation device, information about a state of the learning vehicle, information about the driving of the learning vehicle, information about driving of other vehicles, and information about a surrounding environment.

15. The electronic device of claim 14, wherein the driving data of the learning vehicle comprises driving data obtained by driving the learning vehicle in a virtual driving environment in which a driving environment comprising a non-consistent pattern is added to a driving environment comprising a consistent pattern.

16. A method comprising:
    detecting a learning object from a video sequence comprising a plurality of learning frames captured while driving a learning vehicle and simultaneously mapping coordinate information to the learning object to obtain a first trained model based on a result of learning a location of the learning object, the location corresponding to the coordinate information of the learning object in the plurality of learning frames,
    obtaining, from a vehicle, a plurality of frames captured while driving the vehicle,
    recognizing a location of an object in at least one of the plurality of frames using the obtained first trained model,
    analyzing a sequential change with respect to the location of the object in the plurality of frames, and
    determining whether a driving event of the vehicle occurs.

17. The method of claim 16, further comprising wherein the recognizing of the location of the object comprises:
    determining a type of the object, and
    determining whether the object is noise by comparing information about a reference size of the type of the object in the recognized location of the object with information about a size of the type of the object in the recognized location of the object.

18. The method of claim 17, wherein the information about the size comprises information in which a range of an area to be occupied by the object in the plurality of frames is predefined based on a distance between the vehicle and the object.

19. A computer program product comprising a non-transitory computer-readable recording medium, having stored thereon instructions, which when executed by a processor, cause an electronic device to:
    detect a learning object from a video sequence comprising a plurality of learning frames captured while driving a learning vehicle and simultaneously map coordinate information to the learning object to obtain a first trained model based on a result of learning a location of the learning object, the location corresponding to the coordinate information of the learning object in the plurality of learning frames,
    obtain, from a vehicle a plurality of frames captured while driving the vehicle,
    recognize a location of an object in at least one of the plurality of frames using the obtained first trained model,
    analyze a sequential change with respect to the location of the object in the plurality of frames, and
    determine whether a driving event of the vehicle occurs.

* * * * *